(12) United States Patent
Nishio et al.

(10) Patent No.: US 10,851,718 B2
(45) Date of Patent: Dec. 1, 2020

(54) DEVICE AND METHOD FOR CONTROLLING ENGINE

(71) Applicant: Mazda Motor Corporation, Hiroshima (JP)

(72) Inventors: Takafumi Nishio, Otake (JP); Takahiro Yamamoto, Hiroshima (JP); Toshiaki Nishimoto, Hiroshima (JP); Masanori Hashimoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/493,205

(22) PCT Filed: Feb. 20, 2018

(86) PCT No.: PCT/JP2018/005867
§ 371 (c)(1),
(2) Date: Sep. 11, 2019

(87) PCT Pub. No.: WO2018/168348
PCT Pub. Date: Sep. 20, 2018

(65) Prior Publication Data
US 2020/0132001 A1  Apr. 30, 2020

(30) Foreign Application Priority Data

Mar. 15, 2017  (JP) ................. 2017-050390

(51) Int. Cl.
*F02D 17/02* (2006.01)
*F01L 13/00* (2006.01)
(Continued)

(52) U.S. Cl.
CPC .......... *F02D 17/02* (2013.01); *F01L 13/0005* (2013.01); *F01M 1/02* (2013.01);
(Continued)

(58) Field of Classification Search
CPC ........ F02D 17/02; F02D 9/08; F02D 13/0207; F02D 13/06; F02D 41/0002;
(Continued)

(56) References Cited

U.S. PATENT DOCUMENTS 10,233,797 B2   3/2019  Hashimoto et al.
2012/0271533 A1* 10/2012 Shishime ............ F02D 41/0025
                                                701/105

(Continued)

FOREIGN PATENT DOCUMENTS

JP  2014199011 A  10/2014
JP  2014199013 A  10/2014
(Continued)

*Primary Examiner* — Mahmoud Gimie
(74) *Attorney, Agent, or Firm* — Alleman Hall Creasman & Tuttle LLP

(57) ABSTRACT

A controller increases an actual oil pressure up to a transient oil pressure (an actuating oil pressure) and then supplies oil adjusted to have the transient oil pressure (the actuating oil pressure) to valve stopping mechanisms to actuate the valve stopping mechanisms. The controller, when actuating the valve stopping mechanisms, starts increase in an intake filling amount when the actual oil pressure increases up to a predetermined determination value set at the transient oil pressure (the actuating oil pressure) or lower.

11 Claims, 10 Drawing Sheets

(51) Int. Cl.
  F01M 1/02 (2006.01)
  F01M 1/16 (2006.01)
  F02D 9/08 (2006.01)
  F02D 13/02 (2006.01)
  F02D 13/06 (2006.01)
  F02D 41/00 (2006.01)
  F02P 5/04 (2006.01)
  F02P 5/15 (2006.01)

(52) U.S. Cl.
  CPC ............. F01M 1/16 (2013.01); F02D 9/08 (2013.01); F02D 13/0207 (2013.01); F02D 13/06 (2013.01); F02D 41/0002 (2013.01); F02P 5/045 (2013.01); F02P 5/15 (2013.01); *F01L 2013/001* (2013.01); *F01L 2820/043* (2013.01); *F01M 2001/0207* (2013.01); *F02D 2041/002* (2013.01); *F02D 2041/0012* (2013.01); *F02D 2200/024* (2013.01)

(58) Field of Classification Search
  CPC ....... F02D 2041/0012; F02D 2041/002; F02D 2200/024; F01L 13/0005; F01L 2013/001; F01L 2820/043; F01M 1/02; F01M 1/16; F01M 2001/0207; F02P 5/046; F02P 5/15
  USPC ............... 123/403, 481, 321, 322, 325, 332
  See application file for complete search history.

(56) References Cited

U.S. PATENT DOCUMENTS

| | | | |
|---|---|---|---|
| 2015/0053174 A1* | 2/2015 | Nishimoto | F02D 41/0087 123/346 |
| 2015/0053175 A1* | 2/2015 | Nishimoto | F02D 13/0219 123/350 |
| 2015/0240671 A1* | 8/2015 | Nakamura | F01L 1/10 123/90.16 |
| 2015/0377151 A1 | 12/2015 | Hashimoto et al. | |
| 2016/0215705 A1 | 7/2016 | Haizaki et al. | |

FOREIGN PATENT DOCUMENTS

| | | |
|---|---|---|
| JP | 2015194132 A | 11/2015 |
| JP | 2016050510 A | 4/2016 |
| JP | 2016094843 A | 5/2016 |

\* cited by examiner

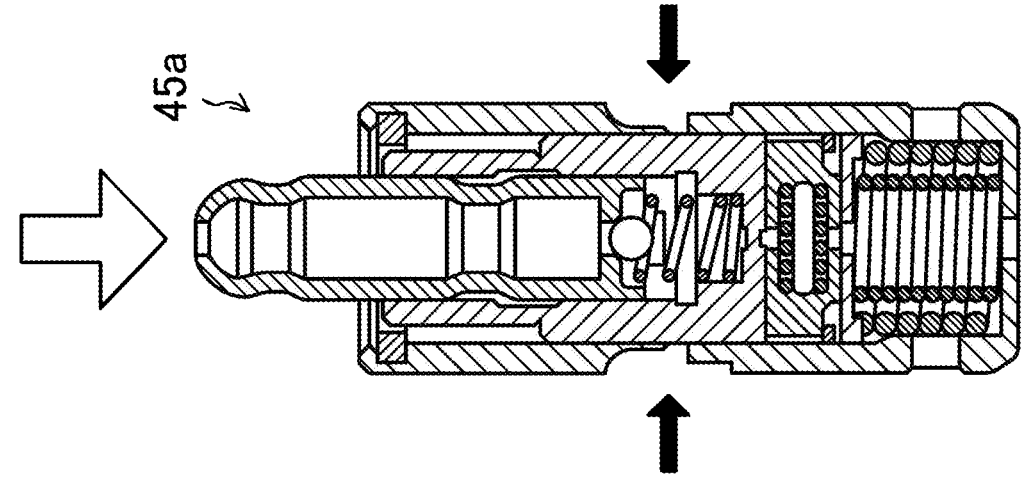
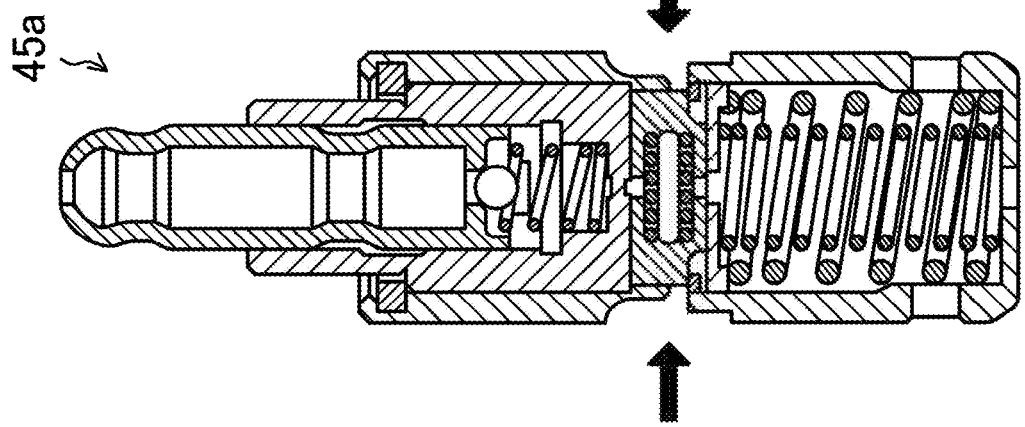
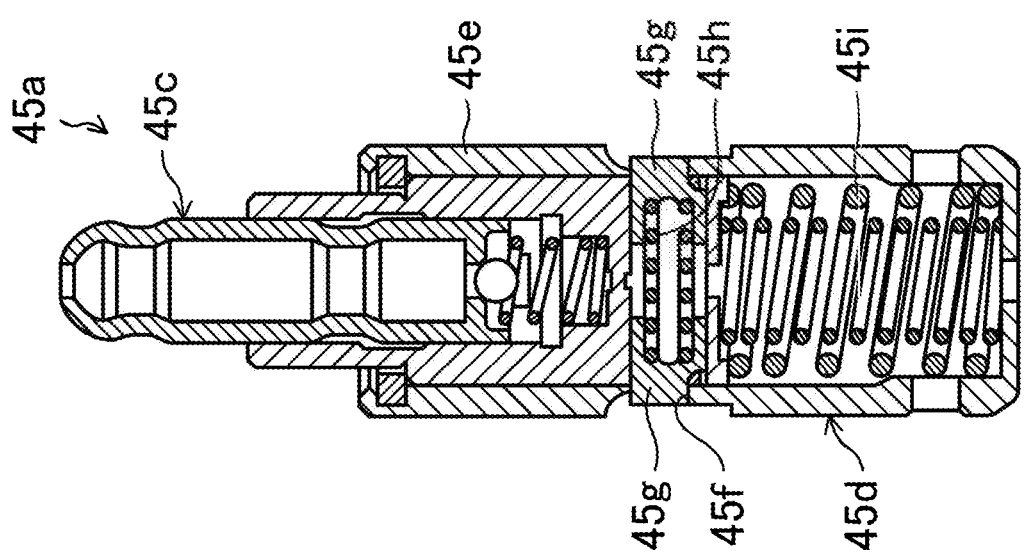

DEVICE AND METHOD FOR CONTROLLING ENGINE

TECHNICAL FIELD

The disclosed technique relates to a device and a method for controlling an engine.

BACKGROUND ART

For example, PATENT DOCUMENT 1 discloses an engine switching between all-cylinder operation, in which all the cylinders are operated, and a deactivated cylinder operation, in which some of the cylinders are deactivated. This engine includes a valve stopping mechanism actuated by receiving oil pressure; pressurized oil is supplied to this valve stopping mechanism, whereby the all-cylinder operation switches to the deactivated cylinder operation.

The engine disclosed in PATENT DOCUMENT 1, when actuating the valve stopping mechanism, increases an intake amount to be supplied to each of the cylinders (an intake filling amount) compared with that during the normal all-cylinder operation in advance. By doing so, when the deactivated cylinder operation starts, a fuel amount per cylinder can be increased while maintaining the air-fuel ratio of a gaseous mixture constant. With this operation, output torque can be maintained constant before and after a transition from the all-cylinder operation to the deactivated cylinder operation.

However, with this configuration, the all-cylinder operation, not the deactivated cylinder operation, continues until the increase in the intake filling amount is completed. All the cylinders are operated while the intake filling amount gradually increases, and the output torque may temporarily increase. This phenomenon is not preferred in substantially preventing the occurrence of torque shock.

Given these circumstances, the engine disclosed in PATENT DOCUMENT 1 temporarily retards ignition timing over a period from start of the increase in the intake filling amount until it is completed. By doing so, even when the all-cylinder operation is performed while increasing the intake filling amount, the overall output torque of the engine can be maintained substantially constant.

CITATION LIST

Patent Document

PATENT DOCUMENT 1: Japanese Unexamined Patent Publication No. 2016-50510

SUMMARY OF THE INVENTION

Technical Problem

As described above, switching to the deactivated cylinder operation is achieved by actuation of the valve stopping mechanism; it is known that, to actuate it, for example, an oil pressure (also referred to as a transient oil pressure or an actuating oil pressure) higher than an oil pressure required for maintenance of the deactivated cylinder operation (a maintaining oil pressure) is required.

Given these circumstances, it is conceivable that before supplying oil to the valve stopping mechanism, the pressure of the oil is increased up to the transient oil pressure in advance. It has been common practice that, at the time of a transition from the all-cylinder operation to the deactivated cylinder operation, pressurization of the oil and the increase in the intake filling amount described in PATENT DOCUMENT 1 are simultaneously started, and after completion of both, control to supply oil to the valve stopping mechanism is performed.

However, in general, compared with the time required for increase in the amount of gas such as intake, there are variations in the time required for raising of oil pressure. The inventors of the present application have noticed that the control described above can deteriorate the fuel economy performance of the engine caused by such variations.

When a delay occurs in the raising of the oil pressure, for example, the increase in the intake filling amount may be completed before the transient oil pressure described above is ensured. In this case, since the valve stopping mechanism cannot be actuated, the all-cylinder operation continues with the intake filling amount remaining increased until the transient oil pressure is ensured.

It is conceivable that as described in PATENT DOCUMENT 1 ignition timing is retarded concurrently with the increase in the intake filling amount in order to substantially prevent the occurrence of torque shock. Normally, when the ignition timing is retarded, engine combustion efficiency reduces. For this reason, to ensure fuel economy performance, a retard period is required to be as short as possible.

However, as described above, when the increase in the intake filling amount is completed before the transient oil pressure is ensured, since the all-cylinder operation continues, the retard of the ignition timing must also be continued in order to substantially prevent the occurrence of torque shock. Then a delay has occurred in the ensuring of the transient oil pressure, and the retard period is prolonged accordingly. This phenomenon is not preferred, causing deterioration in fuel economy performance.

The disclosed technique has been made in view of the above points, and an object thereof is to substantially prevent deterioration in fuel economy performance at the time of a transition from the all-cylinder operation to the deactivated cylinder operation in a device for controlling an engine including a hydraulic valve stopping mechanism.

Solution to the Problem

A disclosed technique is directed to a device for controlling an engine including a plurality of cylinders and switching between all-cylinder operation, in which all the cylinders are operated, and deactivated cylinder operation, in which some of the cylinders are deactivated. The device includes a valve stopping mechanism configured to actuate to switch the engine from the all-cylinder operation to the deactivated cylinder operation when oil pressurized up to a predetermined actuating oil pressure is supplied, an oil supply device configured to discharge oil to a hydraulic passage connected to the valve stopping mechanism and to adjust an oil pressure of the oil, a control valve configured to supply oil from the hydraulic passage to the valve stopping mechanism, a filling amount adjusting device configured to adjust an intake filling amount indicating an amount of gas to be supplied to each of the cylinders, a controller connected to the oil supply device, the control valve, and the filling amount adjusting device and configured to output a control signal to each of the oil supply device, the control valve, and the filling amount adjusting device to operate the engine, and an oil pressure sensor connected to the controller, and configured to detect a pressure of oil flowing through the hydraulic passage and to output a signal indicating a detection result to the controller.

The controller outputs a control signal to the oil supply device to increase the oil pressure detected by the oil pressure sensor up to the actuating oil pressure and then outputs a control signal to the oil control valve to supply the oil adjusted to be the actuating oil pressure to the valve stopping mechanism to actuate the valve stopping mechanism.

The controller, when actuating the valve stopping mechanism, after outputting the control signal to the oil supply device, outputs a control signal to the filling amount adjusting device to increase the intake filling amount compared with that at a start time of raising the oil pressure when the oil pressure detected by the oil pressure sensor increases up to a predetermined determination value set at the actuating oil pressure or lower.

That is to say, this control device includes the valve stopping mechanism actuated by receiving oil pressure and may cause the engine to make a transition from the all-cylinder operation to the deactivated cylinder operation by actuating this valve stopping mechanism. In that case, oil pressurized up to the predetermined operating pressure is required to be supplied to the valve stopping mechanism, and the oil pressure is required to be increased via the oil supply device in advance.

To maintain output torque constant before and after a transition to the deactivated cylinder operation, the intake filling amount is also required to be increased via the filling amount adjusting device before supplying the oil to the valve stopping mechanism.

In this manner, when actuating the valve stopping mechanism, pressurization of the oil and increase in the intake filling amount are required. However, compared with the time required for increase in the amount of gas such as intake, there are variations in the time required for the raising of the oil pressure. Owing to such variations, the fuel economy performance of the engine may deteriorate.

When a general oil pump is used as the oil supply device, for example, the discharge amount per unit time of the oil pump decreases in a low speed range, and a lower speed gives a slower increase in the oil pressure. The deactivated cylinder operation is in general performed in lower speed ranges, and at the time of a transition from the all-cylinder operation to the deactivated cylinder operation, the time required for the ensuring of the actuating oil pressure tends to be longer than the time required for the increase in the intake filling amount. Given these circumstances, when the pressurization of the oil and the increase in the intake filling amount are simultaneously started as in usual cases, increase in the intake filling amount can be completed before the actuating oil pressure described above is ensured. In this case, as long as the valve stopping mechanism cannot be actuated, the all-cylinder operation continues with the intake filling amount remaining increased until the actuating oil pressure is ensured.

It is conceivable that as described in PATENT DOCUMENT 1 when the all-cylinder operation continues while increasing the intake filling amount, ignition timing is retarded concurrently with the increase in the intake filling amount in order to reduce torque shock Usually, when the ignition timing is retarded, the combustion efficiency of an engine reduces. To ensure fuel economy performance, a retard period is required to be as short as possible.

However, as described above, when the increase in the intake filling amount is completed before the actuating oil pressure is ensured, so long as the all-cylinder operation continues, the retard of the ignition timing must also be continued in order to substantially prevent the occurrence of torque shock. Then a delay has occurred in the ensuring of the actuating oil pressure, and the retard period is prolonged accordingly. This phenomenon is not preferred, causing deterioration in fuel economy performance. To reduce the retard period, the deactivated cylinder operation is required to be started as soon as possible upon completion of the increase in the intake filling amount.

This control device starts the increase in the intake filling amount after the oil pressure increases up to the predetermined determination value. In accordance with the setting of the determination value, the start of the increase in the intake filling amount can be delayed. Owing to that, the time when the actuating oil pressure is ensured can be advanced relative to the time when the increase in the intake filling amount is completed. Consequently, even when the raising of the oil pressure varies, the deactivated cylinder operation can be started as soon as possible upon completion of the increase in the intake filling amount. With this operation, deterioration in fuel economy performance can be substantially prevented at the time of a transition from the all-cylinder operation to the deactivated cylinder operation.

The controller, when actuating the valve stopping mechanism, may output a control signal to the filling amount adjusting device when the oil pressure detected by the oil pressure sensor increases up to the actuating oil pressure.

With this configuration, the actuating oil pressure can be surely ensured before increase in the intake filling amount is completed, and the deactivated cylinder operation can be thus started without continuing the all-cylinder operation upon completion of the increase in the intake filling amount. Consequently, this is advantageous in substantially preventing deterioration in fuel economy performance at the time of a transition from the all-cylinder operation to the deactivated cylinder operation.

In addition, in this case, the ensuring of the actuating oil pressure and the increase in the intake filling amount are completed surely one by one, and the transition from the all-cylinder operation to the deactivated cylinder operation can thus be made more stably than a case in which both are simultaneously started.

The oil supply device may include a variable capacity oil pump; and an oil control valve connected to the controller and configured to receive the control signal of the controller and to adjust an oil discharge amount of the oil pump to control the oil pressure of the oil.

With this configuration, the oil discharge amount is adjusted via the oil control valve, whereby appropriate control can be achieved when the actuating oil pressure is ensured.

The device may further include a spark plug connected to the controller and configured to receive the control signal of the controller to ignite a gaseous mixture within the cylinders with predetermined ignition timing. The controller, when actuating the valve stopping mechanism, may output a control signal to the spark plug to reduce output torque per cylinder by retarding the ignition timing compared with that at a start time of raising the oil pressure by the oil supply device.

The ignition timing at the start time of raising of the oil pressure includes timing when the engine generates the maximum torque (minimum spark advance for best torque: MBT), for example. The controller retards the ignition timing than MBT, for example, and can thereby reduce output per cylinder.

When the increase in the intake filling amount starts, a fuel amount per cylinder can be increased while maintaining the air-fuel ratio of the gaseous mixture constant. With this operation, the output torque can be maintained constant before and after a transition from the all-cylinder operation to the deactivated cylinder operation. However, until the increase in the intake filling amount is completed, the all-cylinder operation, not the deactivated cylinder operation, continues. All the cylinders are operated while the amount of the gas mixture gradually increases, and the output torque may temporarily increase. This phenomenon is not preferred in substantially preventing the occurrence of torque shock.

In contrast, this control device temporarily retards the ignition timing of the gaseous mixture at the time of a transition to the deactivated cylinder operation. The ignition timing is retarded, and the output torque per cylinder can be reduced accordingly. With this operation, both the increase in the intake filling amount and reduction in torque shock can be achieved.

The filling amount adjusting device may include a variable valve timing mechanism provided in each of the cylinders and configured to change opening/closing timing of an intake valve and an exhaust valve of an associated cylinder and a throttle valve provided in an intake passage connected to the cylinders and configured to adjust a flow of gas passing through the intake passage.

With this configuration using the variable valve timing mechanism and the throttle valve can achieve appropriate control corresponding to the operating state of the engine when the intake filling amount is increased.

Another disclosed technique is directed to a method of controlling an engine including a plurality of cylinders and switching between all-cylinder operation, in which all the cylinders are operated, and deactivated cylinder operation, in which some of the cylinders are deactivated. The device includes a valve stopping mechanism configured to actuate to switch the engine from the all-cylinder operation to the deactivated cylinder operation when oil pressurized up to a predetermined actuating oil pressure is supplied, an oil supply device configured to discharge oil to a hydraulic passage connected to the valve stopping mechanism and to adjust an oil pressure of the oil, a control valve configured to supply oil from the hydraulic passage to the valve stopping mechanism, a filling amount adjusting device configured to adjust an intake filling amount indicating an amount of gas to be supplied to each of the cylinders, a controller connected to the oil supply device, the control valve, and the filling amount adjusting device and configured to output a control signal to each of the oil supply device, the control valve, and the filling amount adjusting device to operate the engine, and an oil pressure sensor connected to the controller, and configured to detect an oil pressure of oil flowing through the hydraulic passage and to output a signal indicating a detection result to the controller.

The method includes, when actuating the valve stopping mechanism, pressurizing the oil flowing through the hydraulic passage to have the actuating oil pressure, after start of the pressurizing, increasing the intake filling amount compared with that at a start time of raising the oil pressure when the oil pressure detected by the oil pressure sensor increases up to a predetermined determination value set at the actuating oil pressure or lower, and after completion of both the pressurizing and the increasing, supplying the oil adjusted to have the actuating oil pressure to the valve stopping mechanism.

This method of control starts the increase in the intake filling amount after the oil pressure increases up to the predetermined determination value. In accordance with the setting of the determination value, the time when the increase in the intake filling amount is started can be delayed. Owing to that, the time when the actuating oil pressure is ensured can be advanced relative to the time when the increase in the intake filling amount is completed. Consequently, even when the raising of the oil pressure varies, the deactivated cylinder operation can be started as soon as possible upon completion of the increase in the intake filling amount. With this operation, deterioration in fuel economy performance can be substantially prevented at the time of a transition from the all-cylinder operation to the deactivated cylinder operation.

Advantages of the Invention

As described above, the device and method for controlling an engine can substantially prevent deterioration in fuel economy performance at the time of a transition from all-cylinder operation to deactivated cylinder operation.

BRIEF DESCRIPTION OF THE DRAWINGS

FIGS. 3A to 3C are diagrams illustrating a configuration and actuation of a valve stopping mechanism: FIG. 3A illustrates a locked state; FIG. 3B illustrates an unlocked state, and FIG. 3C illustrates a state in which valve actuation stops.

DESCRIPTION OF EMBODIMENTS

The following describes an exemplary embodiment in detail based on the accompanying drawings.

<Engine>

Figure 1:
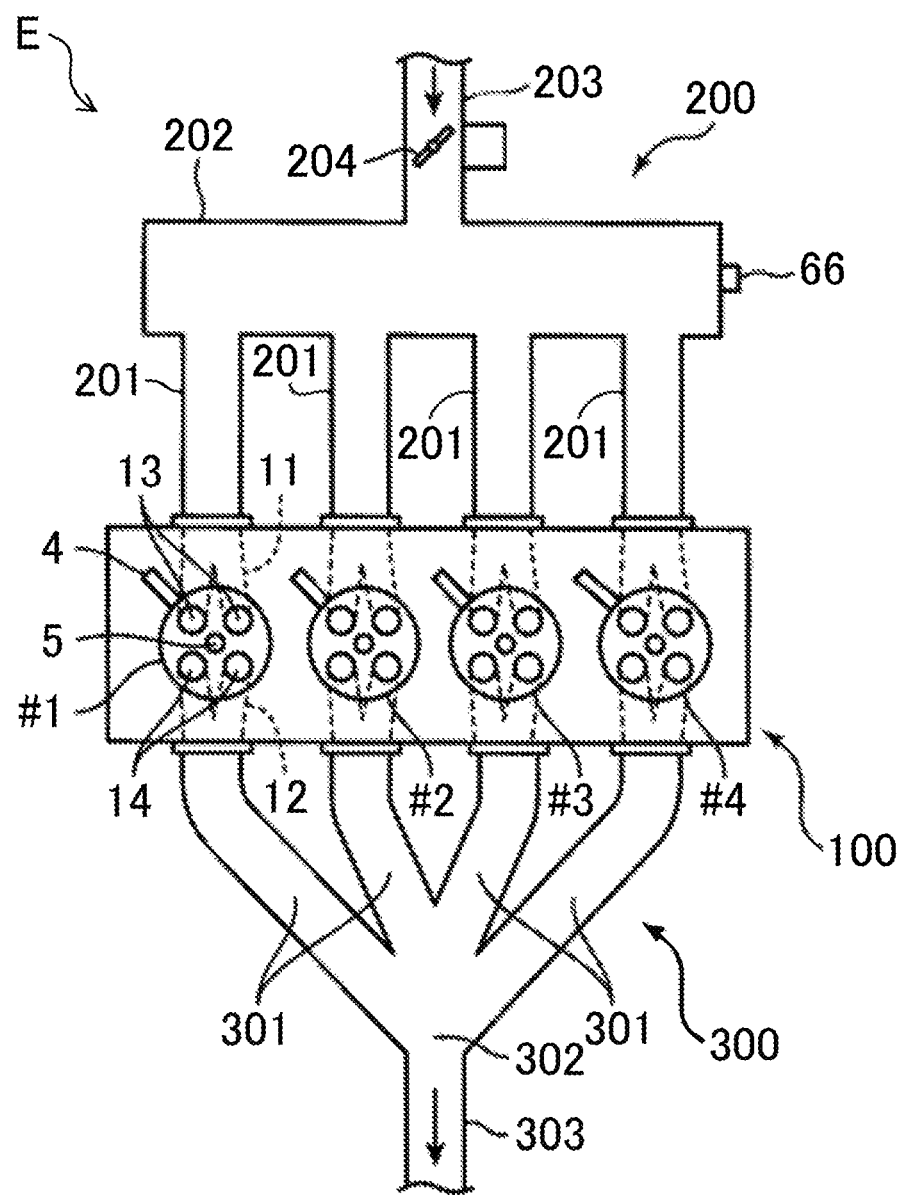
FIG. 1 is a diagram exemplifying a schematic configuration of an engine.

FIG. 1 illustrates a schematic configuration of an engine. This engine E is an in-line four-cylinder engine mounted on an automobile. That is to say, this engine E includes an engine body 100 having in-line four cylinders, an intake passage 200 for introducing gas into the engine body 100, and an exhaust passage 300 for leading out exhaust gas from the engine body 100. In the following, the four cylinders may be referred to as "a first cylinder (#1)," "a second cylinder (#2)," "a third cylinder (#3)," and "a fourth cylinder (#4)" in order from an end along a cylinder bank. The engine E switches between operation that operates all these cylinders (all-cylinder operation) and operation that deactivates some, such as the half number, of cylinders (deactivated cylinder operation) in accordance with an operating state of the engine E for the purpose of, for example, reduction in fuel consumption.

Figure 2:
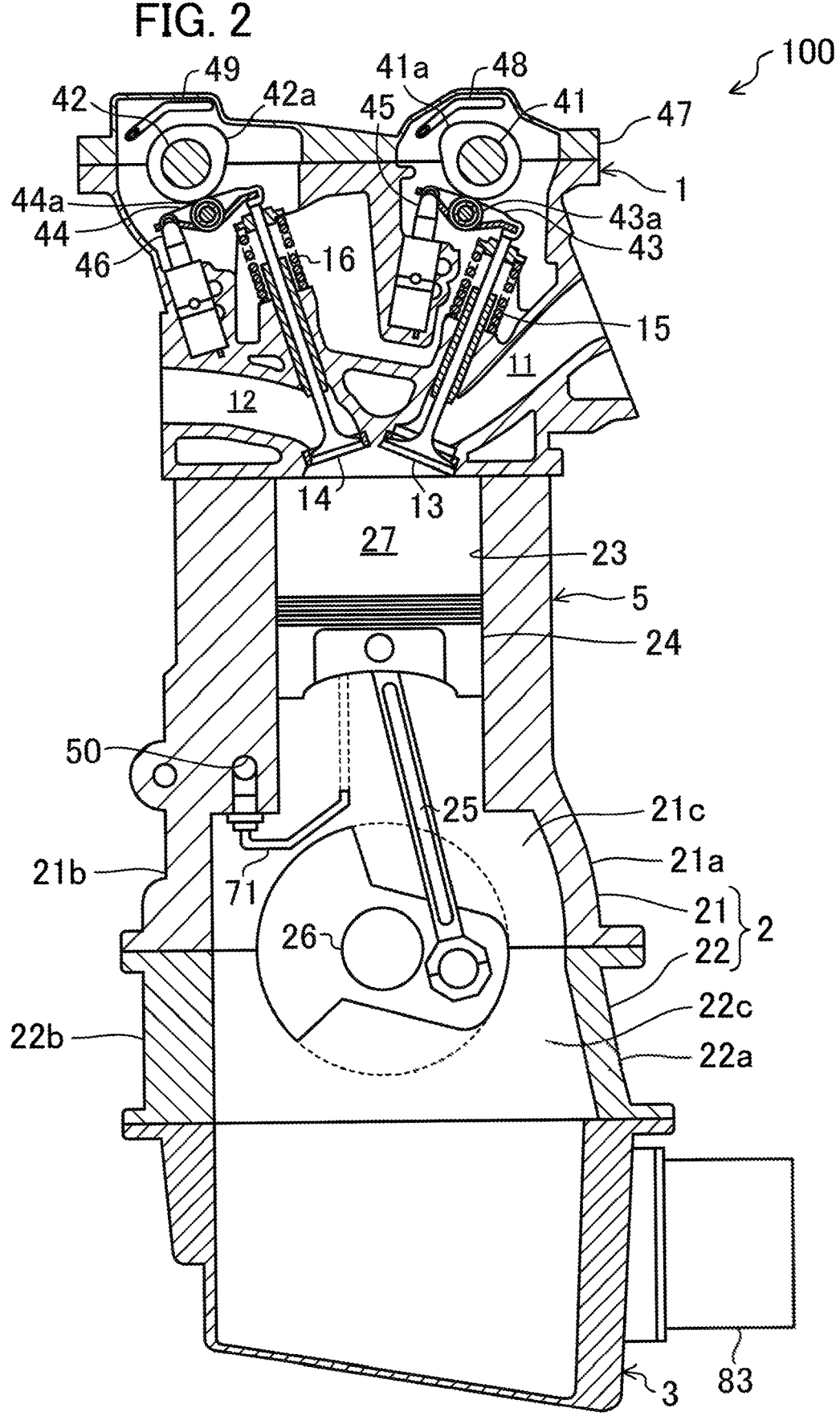
FIG. 2 is a sectional view exemplifying a configuration of an engine body.

FIG. 2 illustrates a schematic sectional view of the engine body 100. The engine body 100 includes a cylinder head 1, a cylinder block 2 mounted on the underside of the cylinder head 1, and an oil pan 3 mounted on the underside of the cylinder block 2. The cylinder block 2 has an upper block 21 and a lower block 22. The lower block 22 is mounted on the undersurface of the upper block 21, and the oil pan 3 is mounted on the undersurface of the lower block 22.

The upper block 21 is formed with four cylindrical cylinder bores 23 forming the respective cylinders extending in an up-and-down direction (FIG. 2 illustrates only one cylinder bore 23). The cylinder head 1 is assembled on the upper block 21 so as to block upper openings of these cylinder bores 23. Within the cylinder bore 23, a piston 24 is installed slidably in the up-and-down direction. The piston 24 is coupled to a crankshaft 26 positioned in a lower place via a connecting rod 25. Within the engine body 100, a combustion chamber 27 is sectioned by an inner circumferential wall of the cylinder bore 23, an upper face of the piston 24, and a lower wall of the cylinder head 1 facing the cylinder bore 23.

Referring back to FIG. 1, the cylinder head 1 is provided with injectors 4, each injecting fuel (e.g., one containing gasoline as a main component) into the combustion chamber 27 of one of the cylinders and spark plugs 5, each igniting a gaseous mixture of the fuel injected from the associated one of the injectors 4 and air with predetermined ignition timing.

The cylinder head 1 is provided with intake ports 11 and exhaust ports 12 having openings in an upper part of the combustion chamber 27. Each intake port 11 causes the combustion chamber 27 of the associated one of the cylinders to communicate with the intake passage 200, whereas each exhaust port 12 causes the combustion chamber 27 of the associated one of the cylinders to communicate with the exhaust passage 300.

The intake passage 200 has four independent intake passages 201 communicating with intake ports 11 of the respective cylinders, a surge tank 202 commonly connected to upstream ends (ends on an upstream side in an intake flow direction) of the respective independent intake passages 201, and one intake pipe 203 extending toward the upstream side from the surge tank 202. A throttle valve 204 configured as what is called an electric throttle is provided midway in the intake pipe 203. The opening of the throttle valve 204 is changed, whereby the flow of gas passing through the intake pipe 203 can be adjusted.

The exhaust passage 300 has four independent exhaust passages 301 communicating with exhaust ports 12 of the respective cylinders, a gathering part 302 in which downstream ends (ends on a downstream side in an exhaust gas flow direction) of the respective independent exhaust passages 301 gather, and one exhaust pipe 303 extending toward the downstream side from the gathering part 302.

As illustrated in FIG. 2, each intake port 11 is provided with an intake valve 13 opening and closing the opening of the intake port 11, whereas each exhaust port 12 is provided with an exhaust valve 14 opening and closing the opening of the exhaust port 12. The intake valve 13 and the exhaust valve 14 are driven by an intake cam 41a provided on an intake cam shaft 41 and an exhaust cam 42a provided on an exhaust cam shaft 42, respectively.

Specifically, the intake valve 13 and the exhaust valve 14 are urged by valve springs 15 and 16, respectively, in a direction closing the openings (an up direction in FIG. 2). An intake swing arm 43 and an exhaust swing arm 44 having cam followers 43a and 44a, respectively, at their respective substantial central parts are interposed between the intake valve 13 and the intake cam 41a and between the exhaust valve 14 and the exhaust cam 42a, respectively.

One ends of the intake swing arm 43 and the exhaust swing arm 44 are supported on hydraulic lash adjusters (HLAs) 45 and 46, respectively. The cam follower 43a or 44a is pushed by the intake cam 41a or the exhaust cam 42a, whereby the intake swing arm 43 or the exhaust swing arm 44 swings about the one end thereof supported on the HLA 45 or 46 as a pivot. Then each another end of the intake swing arm 43 or the exhaust swing arm 44, which is swinging, pushes down the intake valve 13 or the exhaust valve 14 against the urging force of the valve spring 15 or 16, thus the intake valve 13 or the exhaust valve 14 moves in a direction opening the opening (a down direction in FIG. 2). The HLAs 45 and 46 automatically adjust a valve clearance to be zero through oil pressure.

The HLAs 45 and 46 provided in the first cylinder and the fourth cylinder are provided with valve stopping mechanisms 45d and 46d, respectively, stopping the motions of the intake valve 13 and the exhaust valve 14, respectively (details will be described below). On the other hand, the HLAs 45 and 46 provided in the second cylinder and the third cylinder are not provided with the valve stopping mechanisms 45d and 46d. In the following, the former may be referred to as high-function HLAs 45a and 46a, whereas the latter may be referred to as standard HLAs 45b and 46b.

Switching between the all-cylinder operation and the deactivated cylinder operation is performed by actuation of the high-function HLAs 45a and 46a (details will be described below). That is to say, oil pressurized up to a predetermined transient oil pressure (an actuating oil pressure) is supplied via an oil supply passage (formed in the cylinder head 1) communicating with the high-function HLAs 45a and 46a, whereby the high-function HLAs 45a and 46a are hydraulically controlled, and switching from the all-cylinder operation to the deactivated cylinder operation is performed.

<Valve Stopping Mechanism>

FIG. 3A to FIG. 3C illustrate the high-function HLA 45a. The structure of the high-function HLA 45a is substantially the same as those of the standard HLAs 45b and 46b except the presence or absence of the valve stopping mechanism 45d, and the following describes the high-function HLA 45a as an example.

The high-function HLA 45a has a pivot mechanism 45c and the valve stopping mechanism 45d. The pivot mechanism 45c is a pivot mechanism of a well-known HLA and automatically adjusts a valve clearance to be zero through oil pressure. The valve stopping mechanism 45d is a mechanism switching between the actuation and the actuation stop of the corresponding intake valve 13 or exhaust valve 14.

As illustrated in FIG. 3A, the valve stopping mechanism 45d has a bottomed cylindrical outer tube 45e housing the pivot mechanism 45c in an axially slidable and protrudable state, a pair of lock pins 45g inserted into two through holes 45f formed in a side circumferential face of the outer tube 45e facing each other in an advanceable and retractable manner, a lock spring 45h urging the lock pins 45g radially outside the outer tube 45e, and a lost motion spring 45i housed in the bottom of the outer tube 45e and urging the pivot mechanism 45c in its protruding direction.

The lock pins 45g are placed at a lower end of the pivot mechanism 45c. The lock pins 45g actuate through oil pressure to switch the valve stopping mechanism 45d between a lock state, in which the pivot mechanism 45c is fixed in a non-displaceable manner, and an unlock state, in which the pivot mechanism 45c axially slides to be displaceable.

FIG. 3A illustrates the lock state. In the lock state, the pivot mechanism 45c protrudes from the outer tube 45e with a relatively large amount of protrusion, and the lock pins 45g is fitted into the through holes 45f, whereby the pivot mechanism 45c is prohibited from moving in the axial direction of the outer tube 45e. In this lock state, an apex of the pivot mechanism 45c is in contact with one end of the intake swing arm 43 or the exhaust swing arm 44 and functions as a pivot of swing thereof.

That is to say, when the valve stopping mechanism 45d is in the lock state, the high-function HLA 45a is substantially the same as the standard HLAs 45b and 46b, and the corresponding intake valve 13 or exhaust valve 14 is actuated as normal.

When a predetermined oil pressure acts on the lock pins 45g as indicated by the black arrow in FIG. 3B by supply of pressurized oil to the high-function HLA 45a, the lock pins 45g move radially inward against the urging force of the lock spring 45h to release fitting with the through holes 45f. Consequently, the lock state switches to the unlock state, in which the lock pins 45g retract within the outer tube 45e to positions not fitted within the through holes 45f.

The pivot mechanism 45c is urged by the lost motion spring 45i and thus protrudes from the outer tube 45e with a relatively large amount of protrusion; the urging force of the lost motion spring 45i is set to be smaller than urging forces of the valve springs 15 and 16 urging the intake valve 13 and the exhaust valve 14 in a closing direction Consequently, in the unlock state, when the cam followers 43a or 44a is pushed by the intake cam 41a or the exhaust cam 42a, the intake swing arm 43 or the exhaust swing arm 44 swings about the apex of the intake valve 13 or the exhaust valve 14 as a pivot and displaces the pivot mechanism 45c toward inside of the outer tube 45e against the urging force of the lost motion spring 45i as indicated by the hollow arrow in FIG. 3C.

That is to say, when the valve stopping mechanism 45d is in the unlock state, the high-function HLA 45a does not function as the HLA, and the corresponding intake valve 13 or exhaust valve 14 stops its actuation. Consequently, a cylinder including the intake valve 13 or the exhaust valve 14 becomes unable to operate to be a cylinder deactivated state, giving the deactivated cylinder operation described above. During the deactivated cylinder operation, the valve stopping mechanism 45d is maintained at the unlock state.

A cam cap 47 is mounted on an upper part of the cylinder head 1. The cylinder head 1 and the cam cap 47 rotatably support the intake cam shaft 41 and the exhaust cam shaft 42.

An intake-side oil shower 48 is provided above the intake cam shaft 41, whereas an exhaust-side oil shower 49 is provided above the exhaust cam shaft 42. The intake side oil shower 48 and the exhaust side oil shower 49 drop oil onto parts at which the intake cam 41a and the exhaust cam 42a are in contact with the cam followers 43a and 44a, respectively, of the intake swing arm 43 and the exhaust swing arm 44, respectively.

<Variable Valve Timing (VVT) Mechanism>

The engine body 100 is provided with variable valve timing mechanisms (hereinafter referred to as a "VVT") changing valve characteristics (specifically opening/closing timing) of each of the intake valve 13 and the exhaust valve 14. In this engine E, an intake-side VVT 17 is of an electrically driven type, whereas an exhaust-side VVT 18 is of a hydraulically driven type.

Figure 4:
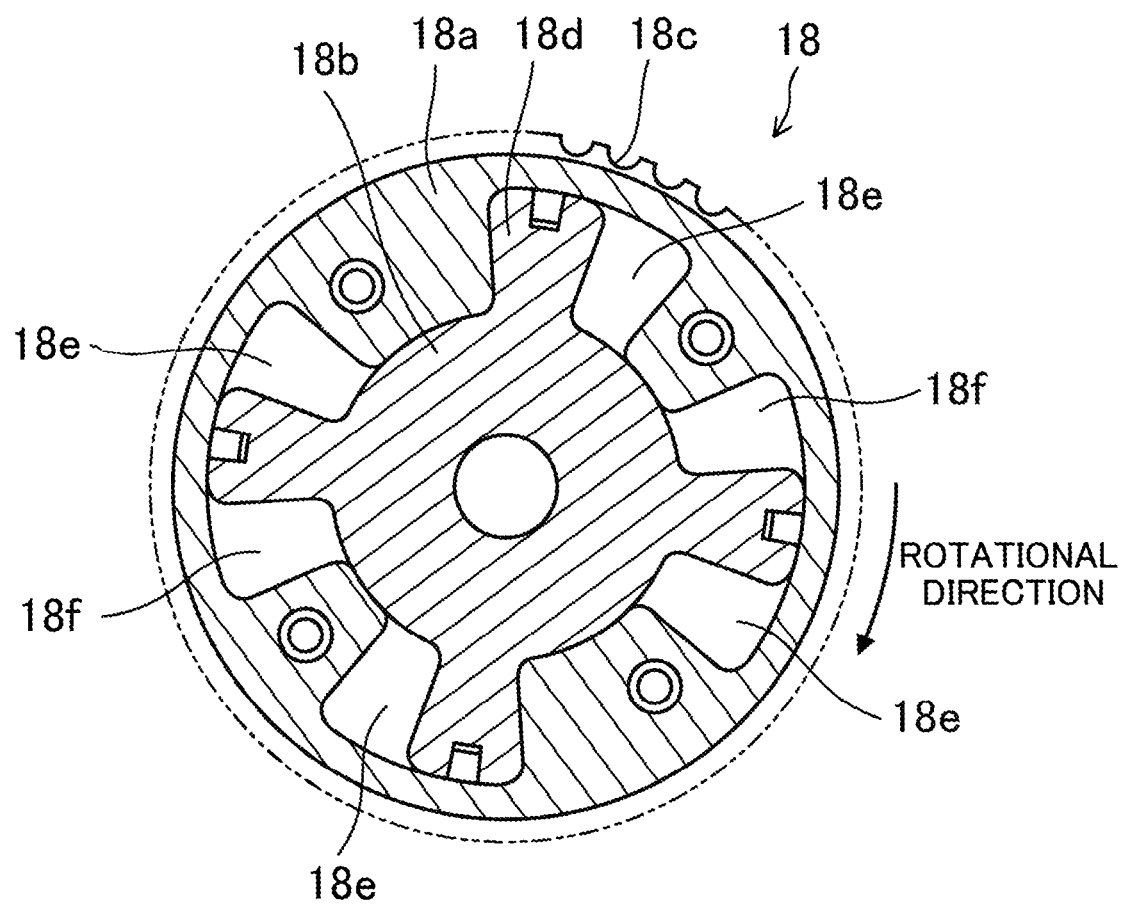
FIG. 4 is a sectional view exemplifying a configuration of a variable valve timing mechanism.

FIG. 4 illustrates the exhaust-side VVT 18. The exhaust-side VVT 18 has a substantially annular housing 18a and a rotor 18b housed within the housing 18a. The housing 18a is integral with a cam pulley 18c rotating in conjunction with the crankshaft 26. The rotor 18b is integral with the exhaust cam shaft 42 opening and closing the exhaust valve 14.

A plurality of radially projecting vane bodies 18d are formed on the outer circumference of the rotor 18b. Within the housing 18a, a plurality of spaces housing the respective vane bodies 18d are formed, and these spaces are sectioned by the vane bodies 18d, thereby forming a plurality of retard-angle chambers 18e and advance-angle chambers 18f within the housing 18a.

Pressurized oil is supplied to each of the retard-angle chambers 18e and advance-angle chambers 18f in order to change the opening/closing timing of the exhaust valve 14. With this operation, when the oil pressure of the retard-angle chambers 18e becomes higher than the oil pressure of the advance-angle chambers 18f, the rotor 18b rotates in the direction opposite to the rotational direction of the housing 18a. That is to say, the exhaust cam shaft 42 rotates in the direction opposite to the cam pulley 18c, the phase angle of the exhaust cam shaft 42 relative to the crankshaft changes to a retarding direction, and consequently the valve opening timing of the exhaust valve 14 is retarded.

On the other hand, the oil pressure of the advance-angle chambers 18f becomes higher than the oil pressure of the retard-angle chambers 18e, the rotor 18b rotates in the same direction as the rotational direction of the housing 18a. That is to say, the exhaust cam shaft 42 rotates in the same direction as the cam pulley 18c, the phase angle of the exhaust cam shaft 42 relative to the crankshaft changes to an advancing direction, and consequently the valve opening timing of the exhaust valve 14 is advanced.

Thus, the exhaust side VVT 18 or the intake side VVT 17 changes the valve opening timing of the exhaust valve 14 or the intake valve 13, whereby an amount of overlapping between a valve opening period of the intake valve 13 and a valve opening period of the exhaust valve 14 can be increased or decreased, and fuel economy performance can be improved, for example, through increase in an internal EGR amount, or reduction in a pumping loss. The control changing the valve opening timing by the exhaust-side VVT 18 or the intake-side VVT 17 is executed in both the all-cylinder operation and the deactivated cylinder operation.

In this engine E, the intake side VVT 17 and the exhaust side VVT 18 form "a filling amount adjusting device" for adjusting an intake amount (an intake filling amount) to be supplied to each of the cylinders together with the throttle valve 204 described above. The filling efficiency of each of the cylinders can be controlled via the filling amount adjusting device. In the following description, controlling the filling efficiency is equivalent to controlling the intake filling amount.

<Hydraulic Control System>

Figure 5:
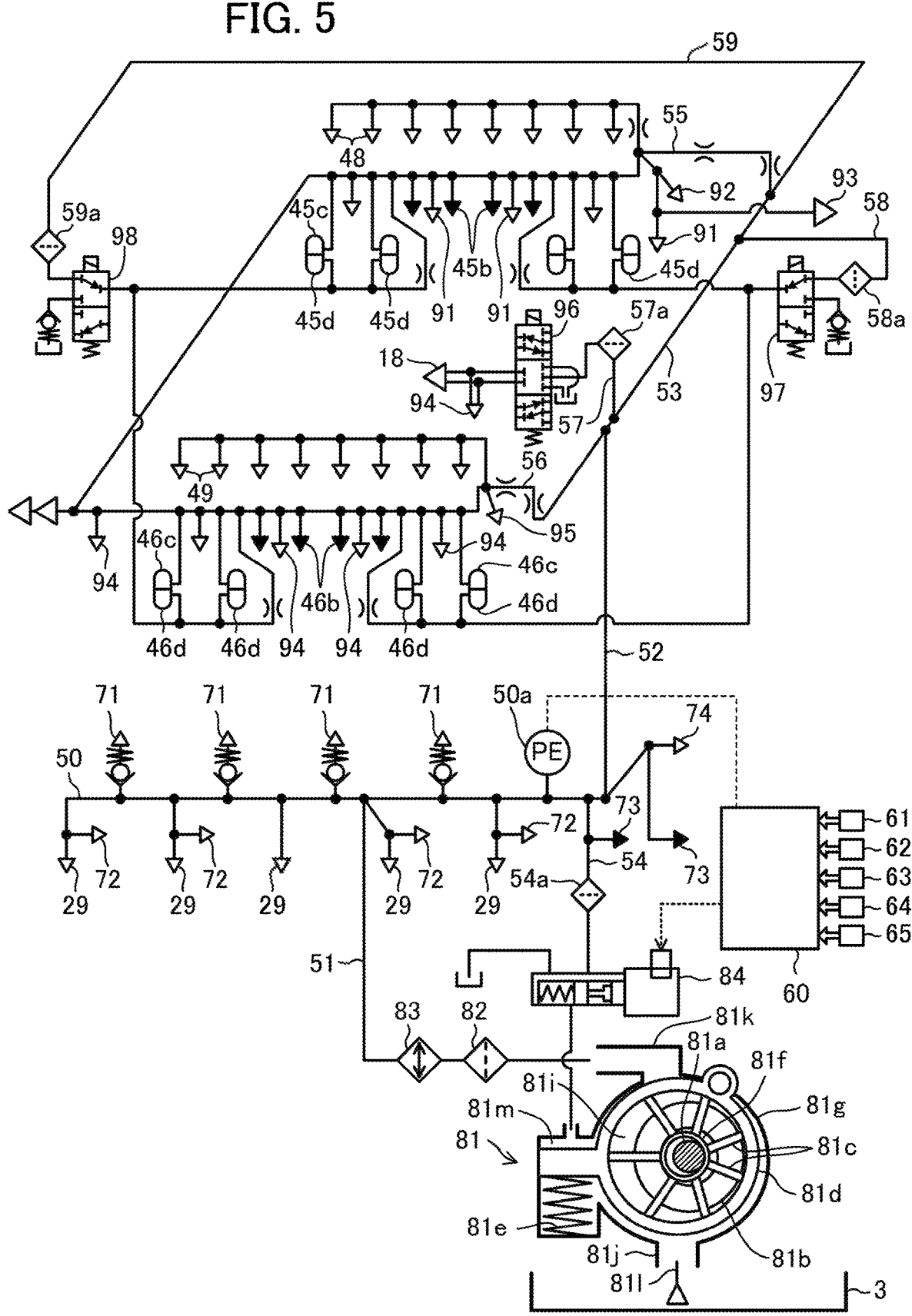
FIG. 5 is a diagram exemplifying a configuration of a hydraulic control system.

FIG. 5 illustrates a hydraulic control system of the engine E. The hydraulic control system is a system supplying oil with a predetermined oil pressure to hydraulically actuated devices (devices actuated hydraulically) attached to the engine E such as the HLAs 45 and 46 and the exhaust side VVT 18 and lubricant parts of the engine E such as bearing parts. The hydraulic control system includes these hydraulically actuated devices, an oil pump 81, and a hydraulic passage.

(Oil Pump)

The oil pump 81 is what is called a variable capacity oil pump and can adjust the flow of oil discharged from the oil pump 81 per unit hour (an oil discharge amount) by changing its capacity. The oil pump 81 is mounted on the undersurface of the lower block 22 and is driven by the crankshaft 26. The oil pump 81, when it is driven, supplies oil to the hydraulically actuated devices via the hydraulic passage.

Specifically, the oil pump 81 has a drive shaft 81$a$, a rotor 81$b$ coupled to the drive shaft 81$a$, a plurality of vanes 81$c$ provided in a radially advanceable and retractable manner from the rotor 81$b$, a cam ring 81$d$ housing the rotor 81$b$ and the vanes 81$c$ and adjusting an eccentricity amount of the rotor 81$b$ relative to a rotational center, a spring 81$e$ urging the cam ring 81$d$ in a direction in which the eccentricity amount of the rotor 81$b$ relative to the rotational center increases, a ring member 81$f$ placed inside the rotor 81$b$, and a housing 81$g$ housing the rotor 81$b$, the vanes 81$c$, the cam ring 81$d$, the spring 81$e$, and the ring member 81$f$.

Although not illustrated, one end of the drive shaft 81$a$ protrudes outside the housing 81$g$. A driven sprocket is coupled to this one end, and a timing chain wound around a drive sprocket of the crankshaft 26 is wound around the driven sprocket. With this configuration, the rotor 81$b$ is rotatingly driven by the crankshaft 26.

When the rotor 81$b$ rotates, the vanes 81$c$ slide on an inner circumferential face of the cam ring 81$d$. With this slide, a plurality of (seven in the example illustrated in FIG. 5) pump chambers 81$i$ sectioned by the rotor 81$b$, two adjacent vanes 81$c$, the cam ring 81$d$, and the housing 81$g$ move in the sliding direction of the vanes 81$c$.

The housing 81$g$ is formed with a suction port 81$j$ sucking oil into the pump chambers 81$i$ and a discharge port 81$k$ discharging oil from the pump chambers 81$i$. An oil strainer 81$l$ (immersed in oil stored in the oil pan 3) is connected to the suction port 81$j$; when the rotor 81$b$ is rotatingly driven, the oils stored in the oil pan 3 is sucked into one of the pump chambers 81$i$ (specifically, the one positioned closest to the suction port 81$j$ among the pump chambers 81$i$) from the suction port 81$j$ via the oil strainer 81$l$. On the other hand, the hydraulic passage is connected to the discharge port 81$k$; the oil sucked from the suction port 81$j$ is discharged from the discharge port 81$k$ to the hydraulic passage when one of the pump chambers 81$i$ that has sucked the oil moves closer to the discharge port 81$k$.

The cam ring 81$d$ is supported on the housing 81$g$ so as to oscillate about a predetermined pivot. The spring 81$e$ urges the cam ring 81$d$ toward one side in an oscillating direction. A pressure chamber 81$m$ to which oil is supplied is sectioned between the cam ring 81$d$ and the housing 81$g$; the oil pressure of the oil within the pressure chamber 81$m$ acts on the cam ring 81$d$. This oil pressure urges the cam ring 81$d$ toward another side in the oscillating direction. Consequently, the cam ring 81$d$ oscillates in accordance with the balance between the urging force of the spring 81$e$ and the oil pressure of the pressure chamber 81$m$, which determines the eccentricity amount of the cam ring 81$d$ relative to the rotational center of the rotor 81$b$. In accordance with the eccentricity amount of the cam ring 81$d$, the capacity of the oil pump 81 changes, and the oil discharge amount changes. Although not illustrated, when the oil is discharged from the pressure chamber 81$m$ to make the cam ring 81$d$ eccentric to one end in the oscillating direction, for example, the volume of the pump chamber 81$i$ positioned closest to the discharge port 81$k$ is the smallest relative to the volume of the pump chamber 81$i$ positioned closest to the suction port 81$j$. In this case, oil discharge pressure is the minimum, and consequently, the oil discharge amount also becomes the minimum. On the other hand, when a sufficient amount of oil is supplied to the pressure chamber 81$m$ to make the cam ring 81$d$ eccentric to the other end in the oscillating direction, the volume of the pump chamber 81$i$ positioned closest to the discharge port 81$k$ is the largest relative to the volume of the pump chamber 81$i$ positioned closest to the suction port 81$j$. In this case, the oil discharge pressure is the maximum, and thereby, the oil discharge amount also becomes the maximum.

(Hydraulic Passage)

The hydraulic passage is formed of hydraulic piping and channels penetrating, for example, the cylinder block 2 Specifically, the hydraulic passage includes, for example, a main gallery 50 (also refer to FIG. 2) extending along the cylinder bank in the cylinder block 2, a control pressure passage 54 diverging from the main gallery 50, a first communicating passage 51 connecting between the oil pump 81 and the main gallery 50, a second communicating passage 52 extending from the main gallery 50 to the cylinder head 1, a third communicating passage 53 extending in a substantially horizontal direction between the intake side and the exhaust side in the cylinder head 1, and first to fifth oil supply passages 55 to 59 diverging from the third communicating passage 53.

The first communicating passage 51 is connected to the discharge port 81$k$ of the oil pump 81 and an intermediate part of the main gallery 50. The first communicating passage 51 is provided with an oil filter 82 and an oil cooler 83 in this order from the oil pump 81. With this configuration, oil discharged from the oil pump 81 to the first communicating passage 51 is filtered by the oil filter 82. The filtered oil is adjusted in its temperature by the oil cooler 83 and then flows into the intermediate part of the main gallery 50.

Oil jets 71 injecting oil on the back side of the four pistons 24 are connected to the main gallery 50 spaced apart from each other along the cylinder bank (also refer to FIG. 2). The oil jets 71 each have a check valve and a nozzle; when an oil pressure of a predetermined value or higher acts, the check valve opens to inject oil from the nozzle. The oil injected from the oil jets 71 can facilitate cooling of the pistons 24.

Further, diverged passages supplying oil to five bearing parts 29 supporting the crankshaft 26 and to bearing parts 72 of four connecting rods 25 are also connected to the main gallery 50 spaced apart from each other along the cylinder bank. One end of the main gallery 50 is a terminal connected to one diverged passage, whereas connected to another end of the main gallery 50 is a diverged passage having the control pressure passage 54, the second communicating passage 52, an oil supply part 73 supplying oil to a hydraulic chain tensioner (not illustrated), and an oil jet 74 injecting oil to a timing chain.

Oil is always supplied to the main gallery 50. At the other end of the main gallery 50, an oil pressure sensor 50$a$ detecting the oil pressure of the oil in the main gallery 50 is installed. Based on a detection value of this oil pressure sensor 50$a$, the oil pressure of the hydraulic passage is controlled (details will be described below).

The control pressure passage 54 is connected to the pressure chamber 81$m$ of the oil pump 81. The control pressure passage 54 is provided with the oil supply part 73, an oil filter 54$a$, and an oil control valve (a discharge amount adjusting device) 84. Oil having passed through the control pressure passage 54 and having been filtered by the oil filter 54$a$ is adjusted in its oil pressure by the oil control valve 84 and then flows into the pressure chamber 81$m$ of the oil pump 81. The oil control valve 84 adjusts the pressure of the pressure chamber 81m and thus the eccentricity amount of the cam ring 81d. As described above, when the eccentricity amount of the cam ring 81d is adjusted, the oil discharge amount of the oil pump 81 increases or decreases. That is to say, the oil control valve 84 serves to adjusting the oil discharge amount of the oil pump 81.

The oil control valve 84 is a linear solenoid valve. The oil control valve 84 adjusts the flow of the oil to be supplied to the pressure chamber 81m in accordance with the duty ratio of an input control signal (=energized time/(energized time+ non-energized time)×100%). A smaller duty ratio gives a smaller amount of the oil to be supplied to the pressure chamber 81m. Consequently, as the duty ratio becomes smaller, the oil discharge amount (a pump flow) increases. When the duty ratio is zero, the oil discharge amount is the maximum. The oil pressure of the oil to be discharged from the oil pump 81 to the hydraulic passage can be adjusted via this oil control valve 84.

In this engine E, the oil control valve 84 forms "an oil supply device," together with the oil pump 81 described above. This oil supply device discharges oil to the hydraulic passage connected to the valve stopping mechanisms 45d and 46d and adjusts the oil pressure of the oil.

The second communicating passage 52 communicates with the third communicating passage 53; the oil in the main gallery 50 flows into the third communicating passage 53 through the second communicating passage 52. The oil having flowed into the third communicating passage 53 is distributed via the third communicating passage 53 to a first oil supply passage 55 positioned on the intake side of the cylinder head 1, a second oil supply passage 56 and a third oil supply passage 57 positioned on the exhaust side thereof, and a fourth oil supply passage 58 and a fifth oil supply passage 59 positioned near a specific cylinder.

Connected to the first oil supply passage 55 are oil supply parts 91 and 92 of the intake-side cam shaft 41, the pivot mechanism 45c of the high-function HLA 45a, the standard HLA 45b, the intake-side oil shower 48, and an oil supply part 93 of a sliding part of the intake side VVT 17.

Connected to the second oil supply passage 56 are oil supply parts 94 and 95 of the exhaust-side cam shaft 42, a pivot mechanism 46c of the high-function HLA 46a, the standard HLA 46b, and the exhaust-side oil shower 49.

Connected to the third oil supply passage 57 via an oil filter 57a and a first direction switching valve 96 are the exhaust-side VVT 18 (specifically, the retard-angle chambers 18e and the advance-angle chambers 18f) and the oil supply part 94 of the exhaust-side cam shaft 42. The first direction switching valve 96 opens and closes, whereby the amount of oil to be supplied to the retard-angle chambers 18e and the advance-angle chambers 18f can be adjusted. That is to say, the first direction switching valve 96 controls actuation of the exhaust side VVT 18.

The fourth oil supply passage 58 is connected to the valve stopping mechanisms 45d and 46d of the high-function HLAs 45a and 46a, respectively, of the first cylinder via an oil filter 58a and a second direction switching valve 97. The second direction switching valve 97 adjusts the amount of oil to be supplied to the valve stopping mechanisms 45d and 46d of the first cylinder. That is to say, the second direction switching valve 97 controls actuation of the valve stopping mechanisms 45d and 46d of the first cylinder. The second direction switching valve 97 exemplifies "a control valve" for supplying oil to the valve stopping mechanisms 45d and 46d from the hydraulic passage.

The fifth oil supply passage 59 is connected to the valve stopping mechanisms 45d and 46d of the high-function HLAs 45a and 46a, respectively, of the fourth cylinder via an oil filter 59a and a third direction switching valve 98. The third direction switching valve 98 adjusts the amount of oil to be supplied to the valve stopping mechanisms 45d and 46d of the fourth cylinder. That is to say, the third direction switching valve 98 controls actuation of the valve stopping mechanisms 45d and 46d of the fourth cylinder. The third direction switching valve 98 also exemplifies "the control valve" like the second direction switching valve 97.

The oil supplied to the parts of the engine E ends cooling and lubrication, then drops into the oil pan 3 through a drain oil passage (not illustrated), and is sucked by the oil pump 81 again. Thus, the hydraulic control system supplies oil with a predetermined oil pressure to the hydraulically actuated devices and circulating parts of the engine E while circulating the oil.

A pressure loss caused by, for example, frictional resistance occurs in the oil flowing through the hydraulic passage, and the oil pressure on the downstream side tends to be lower than that on the upstream side. A longer passage is likely to give a larger amount of reduction. A longer passage gives worse response of oil pressure, and even when the discharge amount of the oil pump 81 is changed, the oil pressure required for all the hydraulically actuated devices cannot necessarily immediately be ensured.

(Controller)

Figure 6:
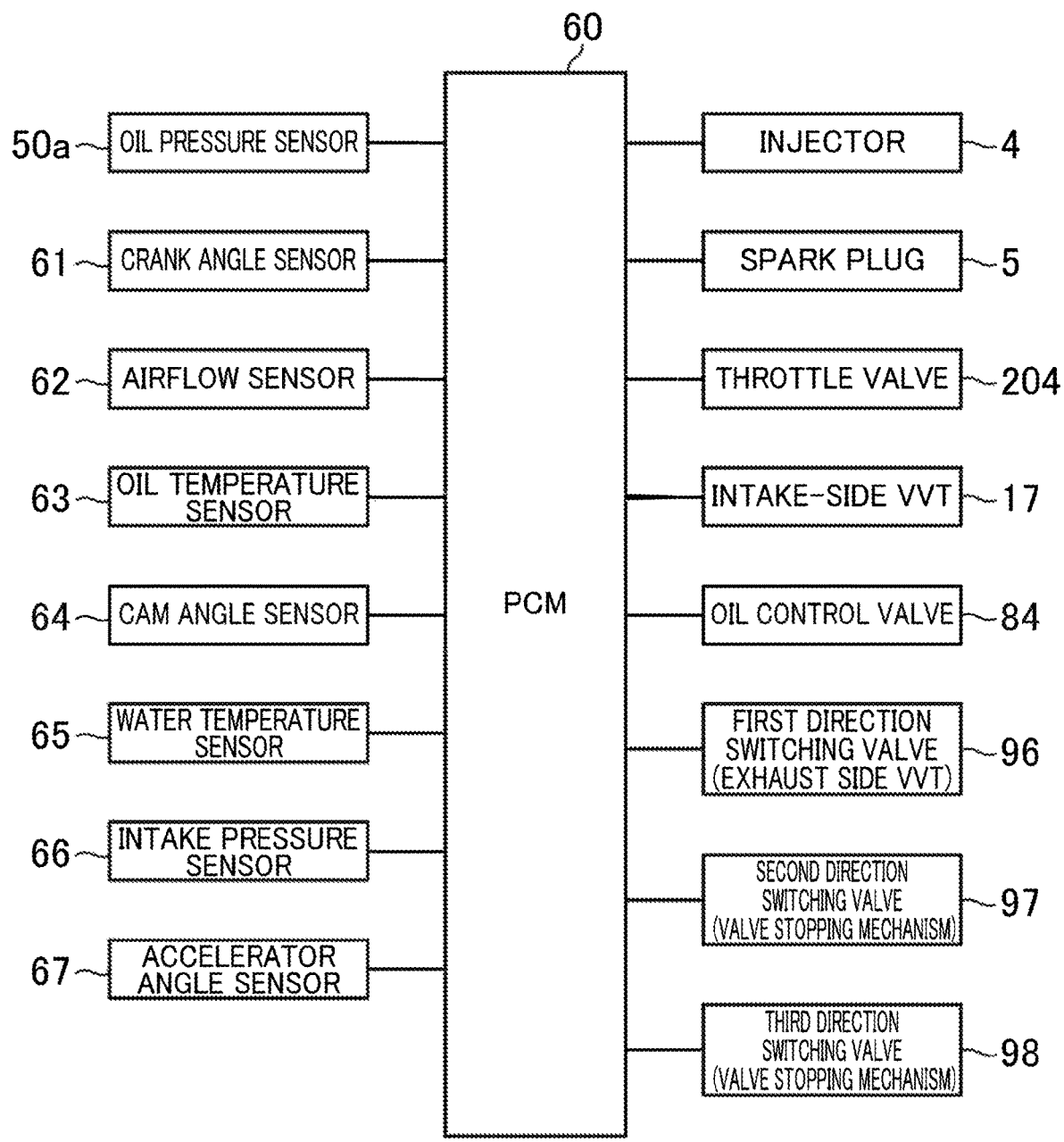
FIG. 6 is a block diagram exemplifying a configuration of a device for controlling an engine.

FIG. 6 exemplifies a configuration of a control device of the engine E. This control device includes a controller 60 for operating the engine E. The controller 60 is a powertrain control module (PCM) based on a well-known microcomputer.

The controller 60 has hardware such as a processor and a memory and software such as control programs and control data and comprehensively controls the entire engine not only the hydraulic control system. As illustrated in FIG. 5 and FIG. 6, various sensors 50a and 61 to 67 are connected to the controller 60. The sensors 50a and 61 to 67 output signals indicating their respective detection results to the controller 60.

Signals are input to the controller 60 from, apart from the oil pressure sensor 50a described above, a crank angle sensor 61 detecting the rotational angle of the crank shaft 26, an airflow sensor 62 detecting the flow of air sucked by the engine E, an oil temperature sensor 63 detecting the temperature of the oil flowing through the hydraulic passage, a cam angle sensor 64 detecting the rotational phase of the intake cam shaft 41 and the exhaust cam shaft 42, a water temperature sensor 65 detecting the temperature of cooling water of the engine E, an intake pressure sensor 66 detecting the pressure within the surge tank 202, and an accelerator angle sensor 67 detecting the depression amount (the accelerator angle) of an accelerator pedal (not illustrated), for example.

The controller 60 acquires an engine speed based on the signal from the crank angle sensor 61, acquires an engine load based on the signal from the airflow sensor 62, and acquires the actuation angles of the intake-side VVT 17 and the exhaust-side VVT 18 based on the signal from the cam angle sensor 64.

The controller 60 determines the operating state of the engine E based on these and calculates control amounts for respective actuators based on the determined operating state. The controller 60 then generates control signals corresponding to the calculated control amounts and outputs the control signals to the actuators such as the injectors 4, the spark plugs 5, the throttle valve 204, and the intake side VVT 17 and the oil control valve 84, the first direction switching valve 96, the second direction switching valve 97, and the third direction switching valve 98 forming the hydraulic control system. The controller 60 controls operation of the engine E via those actuators.

<Basic Control>

The controller 60 changes the opening of the throttle valve 204 so as to achieve a requested torque set in accordance with the detection result of the accelerator angle sensor 67, that is, the accelerator angle, for example.

Specifically, the controller 60 grasps the operating state of the engine E based on the detection results of the respective sensors and sets a requested torque corresponding to the operating state. The controller 60 then determines requested filling efficiency, which is filling efficiency required for achieving the requested torque, and determines an air amount (a requested air amount) within the intake passage 200 required for achieving the requested filling efficiency. The requested air amount is calculated based on the requested filling efficiency and the operating state of the engine E.

Next, the controller 60 determines a target value of an airflow passing through the throttle valve 204 based on the requested air amount, the current air amount within the intake passage 200, and an airflow sucked from the intake passage 200 to the cylinders and adjusts opening of the throttle valve 204 so as to achieve the target value.

The controller 60 determines a fuel amount to be supplied to each of the cylinders based on, for example, the requested filling efficiency described above. The controller 60 then controls the associated spark plug 5 so as to ignite a gaseous mixture of the fuel and air supplied to the cylinder with predetermined ignition timing. Specifically, the controller 60 stores therein a map corresponding to the engine speed and the engine load in advance, and the controller 60 determines ignition timing corresponding to the engine speed and the engine load from this map and corrects the ignition timing based on the detection result of, for example, the intake pressure sensor 66.

The ignition timing is set to timing with a phase shifted by 180 CA each between the cylinders. In this engine E, during the all-cylinder operation, ignition is performed in order of the first cylinder, the third cylinder, the fourth cylinder, and the second cylinder.

<Hydraulic Control>

The controller 60 output a control signal to the oil control valve 84 to adjust the discharge amount (the oil discharge amount) of the oil pump 81. The controller 60 adjusts the oil discharge amount via the control signal to control the oil pressure to be supplied to the hydraulically actuated devices such as the valve stopping mechanisms 45*d* and 46*d*.

Specifically, the controller 60 generates a control signal making the oil pressure detected by the oil pressure sensor 50*a* become an oil pressure (a target oil pressure) set in accordance with the operating state of the engine E and outputs the control signal to adjust the oil discharge amount of the oil pump 81 through adjustment of opening of the oil control valve 84. In the following, such hydraulic control will be referred to as "feedback control."

In the feedback control, for example, the oil pressure (a transient oil pressure) required for actuation of the valve stopping mechanisms 45*d* and 46*d* (pushing of the lock pins 45*g*) is set as the target oil pressure, whereby the transient oil pressure can be ensured.

The following describes the ensuring of the transient oil pressure as a specific example of the feedback control of oil pressure.

The controller 60 acquires the transient oil pressure required for actuation of the valve stopping mechanisms 45*d* and 46*d* by comparing with a corresponding map. This map is stored in the memory in advance. The controller 60 then sets the transient oil pressure as the target oil pressure.

Next, the controller 60 increases the target oil pressure based on an oil pressure reduction allowance when oil flows from the oil pump 81 to the position of the oil pressure sensor 50*a* to calculate a corrected target oil pressure. The oil pressure reduction allowance is stored in the memory in advance. The controller 60 converts the corrected target oil pressure into the flow (the oil discharge amount) of the oil pump 81 to acquire a target flow (a target discharge amount).

Subsequently, the controller 60 corrects the target flow based on the consumption flows of the respective hydraulically actuated devices. Specifically, the controller 60 converts the predicted actuation amount of the valve stopping mechanisms 45*d* and 46*d* when actuating the valve stopping mechanisms 45*d* and 46*d* into a flow to obtain a flow (a consumption flow) consumed when actuating the valve stopping mechanisms 45*d* and 46*d*.

Further, the controller 60 corrects the target oil pressure based on an oil pressure feedback amount. When the oil discharge amount increases or decreases, owing to the response delay of the oil pump 81, the oil pressure (an actual oil pressure) detected by the oil pressure sensor 50*a* follows a change in the target oil pressure with delay. A change in the actual oil pressure owing to such an oil pressure response delay can be predicted, for example, by experiment in advance, and an oil pressure thus predicted (a predicted oil pressure) is stored in the memory. The controller 60 determines a value (the oil pressure feedback amount) corresponding to a deviation of the actual oil pressure from the predicted oil pressure and corrects the target oil pressure using the oil pressure feedback amount. With this operation, the actual oil pressure can be smoothly made to match the target oil pressure.

The controller 60 compares the thus corrected target flow (a corrected target flow) and the speed of the engine E with a duty ratio map to set a target duty ratio and transmits a control signal thereof to the oil control valve 84. With this operation, the oil pump 81 discharges oil with a predetermined amount, and the oil pressure of the hydraulic passage (especially the main gallery 50) is adjusted to be the target oil pressure.

<Control of Number of Cylinders>

This engine E switches between the all-cylinder operation, in which all the cylinders (the first to fourth cylinders) are operated to execute combustion, and the deactivated cylinder operation, in which some cylinders (the first and fourth cylinders) are deactivated to execute combustion by the residual cylinders (the second and third cylinders), in accordance with the operating state thereof.

Figure 7:
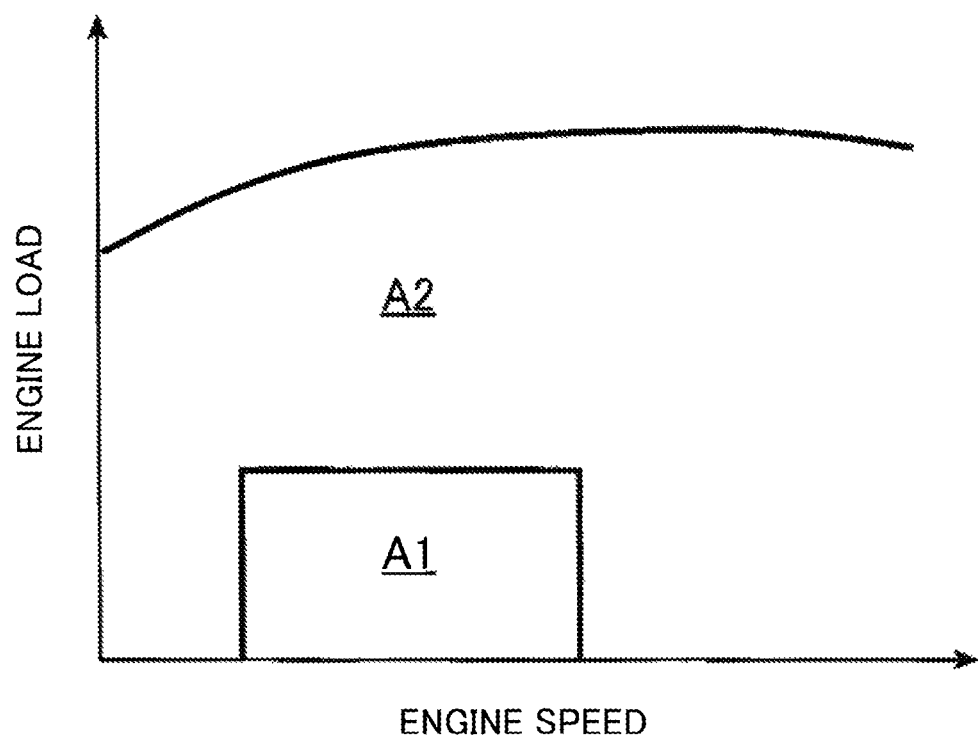
FIG. 7 is a diagram illustrating a deactivated cylinder operating region.

Specifically, as illustrated in FIG. 7, when the operating state of the engine E is within a specific operating range A1 (a deactivated cylinder operating range), in which the engine speed is relatively low, the deactivated cylinder operation described above is executed. When the operating state of the engine E is within the residual operating range A2 other than the deactivated cylinder operating range A1, the normal all-cylinder operation is executed. When the deactivated cylinder operation is executed, actuation of the spark plugs 5 is prohibited in the first cylinder and the fourth cylinder; consequently, combustion occurs in order with one skipped like the first cylinder (deactivated), the third cylinder (operated), the fourth cylinder (deactivated), the second cylinder (operated).

Although not illustrated, the all-cylinder operation and the deactivated cylinder operation can be switched also in accordance with the water temperature. When the engine E travels at a predetermined speed and a predetermined load, and the engine E warms up to increase the water temperature, for example, the all-cylinder operation is executed when the water temperature is lower than a predetermined temperature, whereas the deactivated cylinder operation is executed when the water temperature is the predetermined temperature or higher.

Specifically, in the middle of executing the all-cylinder operation, when determining that the operating state of the engine E has reached the deactivated cylinder operating range A1, for example, the controller 60 establishes a deactivated cylinder flag and makes a transition from the all-cylinder operation to the deactivated cylinder operation (details will be described below).

During the deactivated cylinder operation, the reduced number of cylinders are operated. Thus, to output torque similar to that during the all-cylinder operation, output torque per cylinder is required to be made larger than that during the all-cylinder operation. Consequently, during the deactivated cylinder operation, a fuel amount per cylinder is required to be increased, and considering the air-fuel ratio of the gaseous mixture, the amount of gas to be supplied to each of the cylinders (the intake filling amount) is also required to be increased like the fuel amount. In this engine E, half the all cylinders are deactivated during the deactivated cylinder operation, and the fuel amount and the intake filling amount are each required to be doubled.

However, there is a delay in a change in the intake filling amount, and when the combustions of the first cylinder and the fourth cylinder are deactivated immediately after the establishment of the deactivated cylinder flag, outputs from the second cylinder and the third cylinder is insufficient, which may cause torque shock.

Actually, switching to the deactivated cylinder operation is achieved by actuation of the valve stopping mechanisms 45d and 46d; to actuate them, the transient oil pressure set to be higher than an oil pressure required for maintenance of the deactivated cylinder operation (a maintaining oil pressure) is required to be ensured, for example. Like the intake filling amount, there is a delay in a change in the oil pressure, and it is difficult to immediately actuate the valve stopping mechanisms 45d and 46d immediately after the establishment of the deactivated cylinder flag.

Given these circumstances, this engine E does not immediately start the deactivated cylinder operation even when the deactivated cylinder flag is established, and prepares for the deactivated cylinder operation while continuing the all-cylinder operation. Specifically, the controller 60 executes increase in the intake filling amount and raising of the oil pressure as preparatory control for the deactivated cylinder operation.

Specifically, the controller 60 increases the intake filling amount per cylinder compared with that in a steady state with the all-cylinder operation and increases the oil pressure of the oil flowing through the hydraulic passage up to the transient oil pressure by the feedback control described above.

Upon completion of the preparatory control, the controller 60 opens both the second direction switching valve 97 and the third direction switching valve 98, thereby supplies the oil adjusted to be the transient oil pressure to the valve stopping mechanisms 45d and 46d, and thereby actuates the valve stopping mechanisms 45d and 46d.

Thus, before supplying oil to the valve stopping mechanisms 45d and 46d, the oil pressure of the oil is required to be increased up to the transient oil pressure in advance. Conventionally, it has been common practice that, during the preparatory control, the increase in the intake filling amount and the raising of the oil pressure are simultaneously started, and after completion of both, oil is supplied to the valve stopping mechanisms 45d and 46d.

However, in general, compared with the time required for increase in the amount of gas such as intake, there are variations in the time required for the raising of the oil pressure. Given these circumstances, the inventors of the present application have noticed that the control described above can deteriorate the fuel economy performance of the engine E caused by such variations.

In a low speed range in particular, the discharge amount per unit time of the oil pump 81 decreases, and a lower speed gives slower rise in the oil pressure. As illustrated in FIG. 7, the deactivated cylinder operation is in general performed in lower speed ranges, and at the time of a transition from the all-cylinder operation to the deactivated cylinder operation, the time required for the ensuring of the transient oil pressure tends to be longer than the time required for the increase in the intake filling amount.

Given these circumstances, when the raising of the oil pressure and the increase in the intake filling amount are simultaneously started as described above, the increase in the intake filling amount may be completed before the transient oil pressure is ensured. In this case, the controller 60 continues the all-cylinder operation with the intake filling amount remaining increased until the transient oil pressure is ensured.

When the all-cylinder operation continues while increasing the intake filling amount, this engine E temporarily retards ignition timing concurrently with the increase in the intake filling amount in order to reduce torque shock from occurring (details will be described below). Usually, when the ignition timing is retarded, the combustion efficiency of the engine E reduces. To ensure fuel economy performance, a retard period is required to be as short as possible.

However, as described above, when the increase in the intake filling amount is completed before the transient oil pressure is ensured, since the all-cylinder operation continues, the retard of the ignition timing must also be continued in order to substantially prevent the occurrence of torque shock. Then a delay has occurred in the ensuring of the transient oil pressure, and the retard period is prolonged accordingly. This phenomenon is not preferred, causing deterioration in fuel economy performance. To reduce the retard period, the deactivated cylinder operation is required to be started as soon as possible upon completion of the increase in the intake filling amount.

Given these circumstances, in the preparatory control for this engine E, the raising of the oil pressure is started prior to the increase in the intake filling amount, and the increase in the intake filling amount is started when the oil pressure increases up to a predetermined determination value.

Specifically, the controller 60, when actuating the valve stopping mechanisms 45d and 46d, outputs a control signal to the oil control valve 84 to start feedback control with the transient oil pressure as the target oil pressure. The controller 60 then outputs control signals to, for example, the intake side VVT 17, the exhaust side VVT 18, and the throttle valve 204 when the actual oil pressure detected by the oil pressure sensor 50a increases up to a predetermined determination value set at the transient oil pressure or lower and thereby starts the increase in the intake filling amount. With this operation, the intake filling amount increases compared with that in the steady state with the all-cylinder operation, especially a point in time of start of the raising of the oil pressure.

In this preparatory control, the increase in the intake filling amount is started with a delay relative to the raising of the oil pressure. Owing to that, the time when the actuating oil pressure is ensured can be advanced relative to the time when the increase in the intake filing amount is completed. Consequently, even when the raising of the oil pressure varies, the deactivated cylinder operation can be started as soon as possible upon completion of the increase in the intake filling amount.

The time when the increase in the intake filling amount is started can be changed as appropriate by changing the setting of the determination value. In this engine E, the magnitude of the determination values is equal to the transient oil pressure. That is to say, in the present embodiment, the increase in the intake filling amount is started on the ensuring of the transient oil pressure.

<Specific Procedure of Control of Number of Cylinders>

Figure 8:
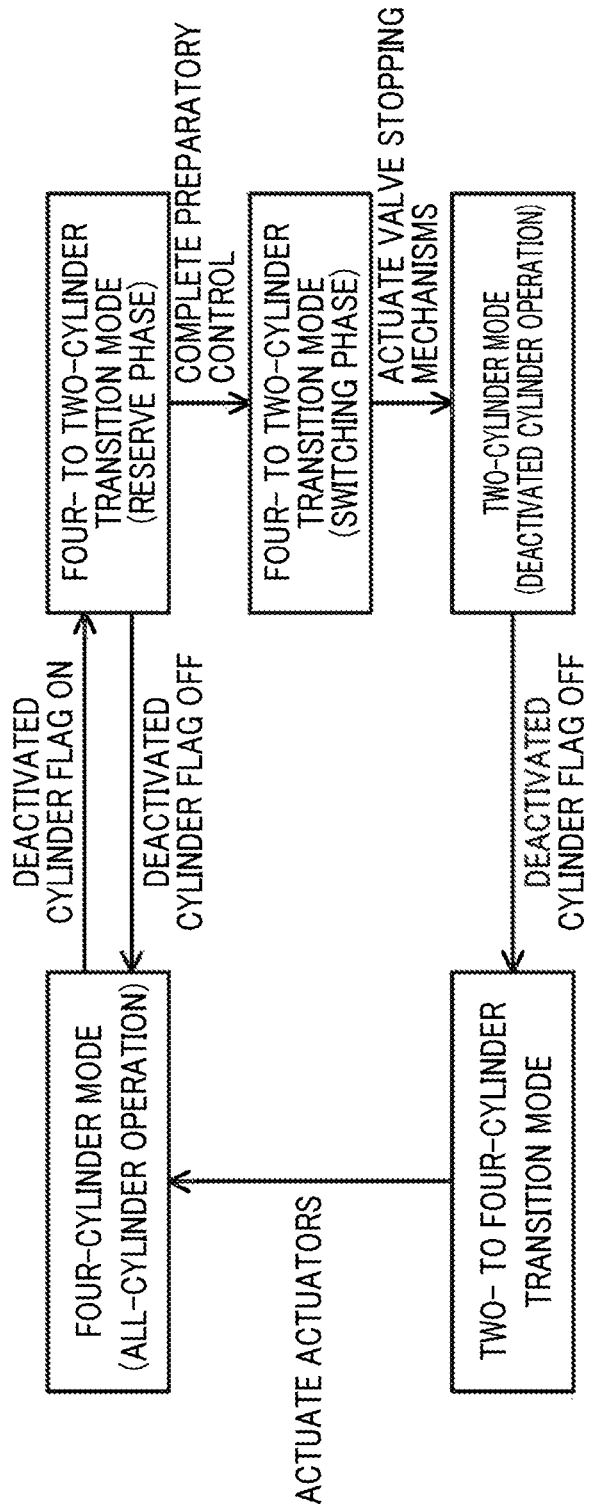
FIG. 8 is a schematic diagram exemplifying control modes of a controller.

FIG. 8 exemplifies a control mode of the controller 60. As illustrated in this drawing, the controller 60 switches mutually among a four-cylinder mode, a four- to two-cylinder transition mode, a two-cylinder mode, and a two- to four-cylinder transition mode.

Specifically, in the four-cylinder mode, the all-cylinder operation (especially steady operation) is performed. In the four- to two-cylinder transition mode, processing on a transition from the all-cylinder operation to the deactivated cylinder operation is executed. In the two-cylinder mode, the deactivated cylinder operation (especially the steady operation) is performed. In the two- to four-cylinder transition mode, processing on a return from the deactivated cylinder operation to the all-cylinder operation is executed.

More specifically, in the four- to two-cylinder transition mode, a reserve phase, in which the preparatory control described above is executed while continuing the all-cylinder operation, and a switching phase, in which the transition from the all-cylinder operation to the deactivated cylinder operation is completed by actuating, for example, the valve stopping mechanisms 45d and 46d, are performed in turn. The reserve phase includes an oil pressure reserve phase for raising the oil pressure and an air reserve phase for increasing the intake filling amount. The oil pressure reserve phase is an example of "pressurizing," the air reserve phase is an example of "increasing," and the switching phase is an example of "supplying."

Figure 9:
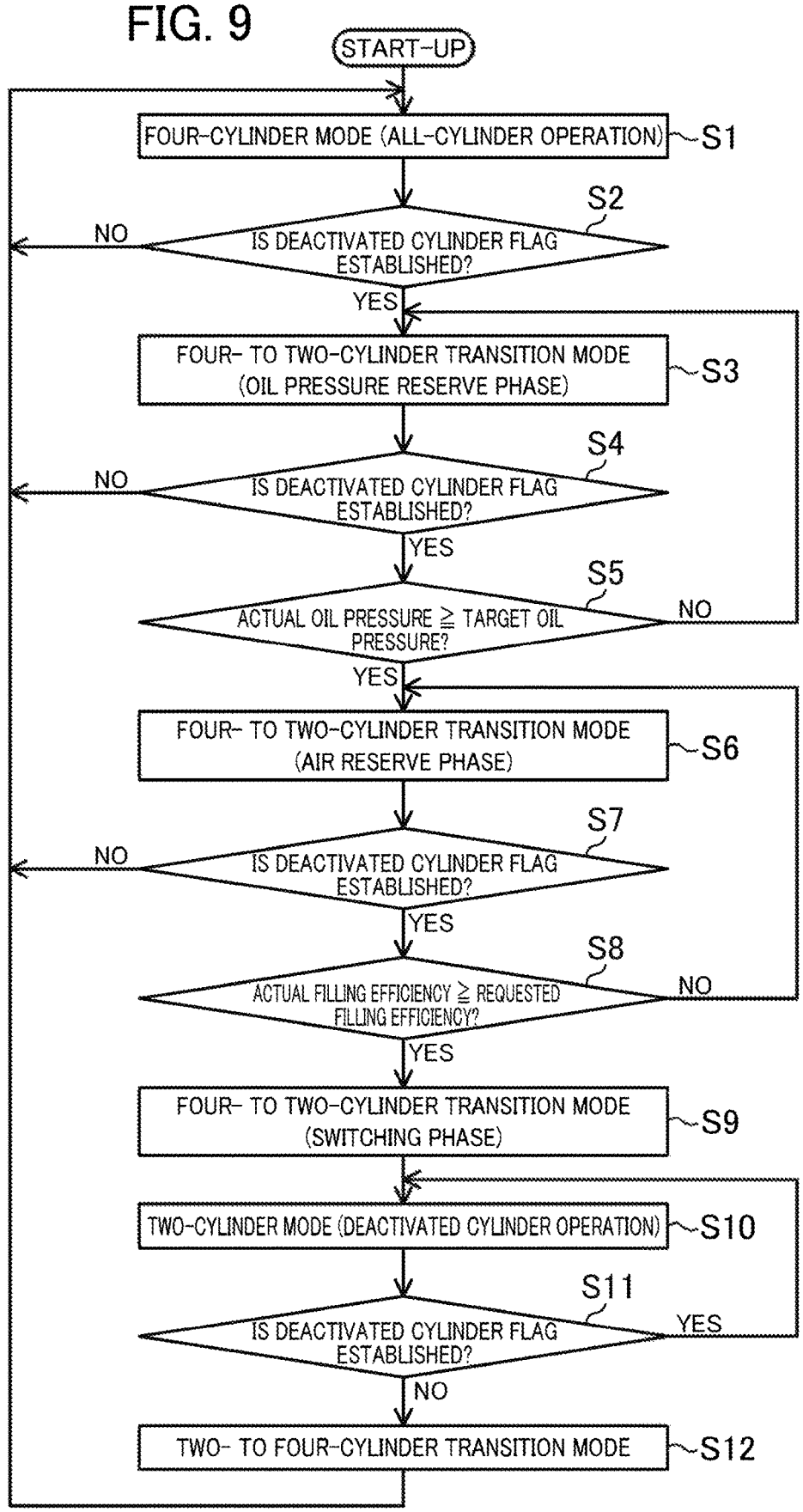
FIG. 9 is a flowchart illustrating processing on switching between all-cylinder operation and deactivated cylinder operation.
Figure 10:
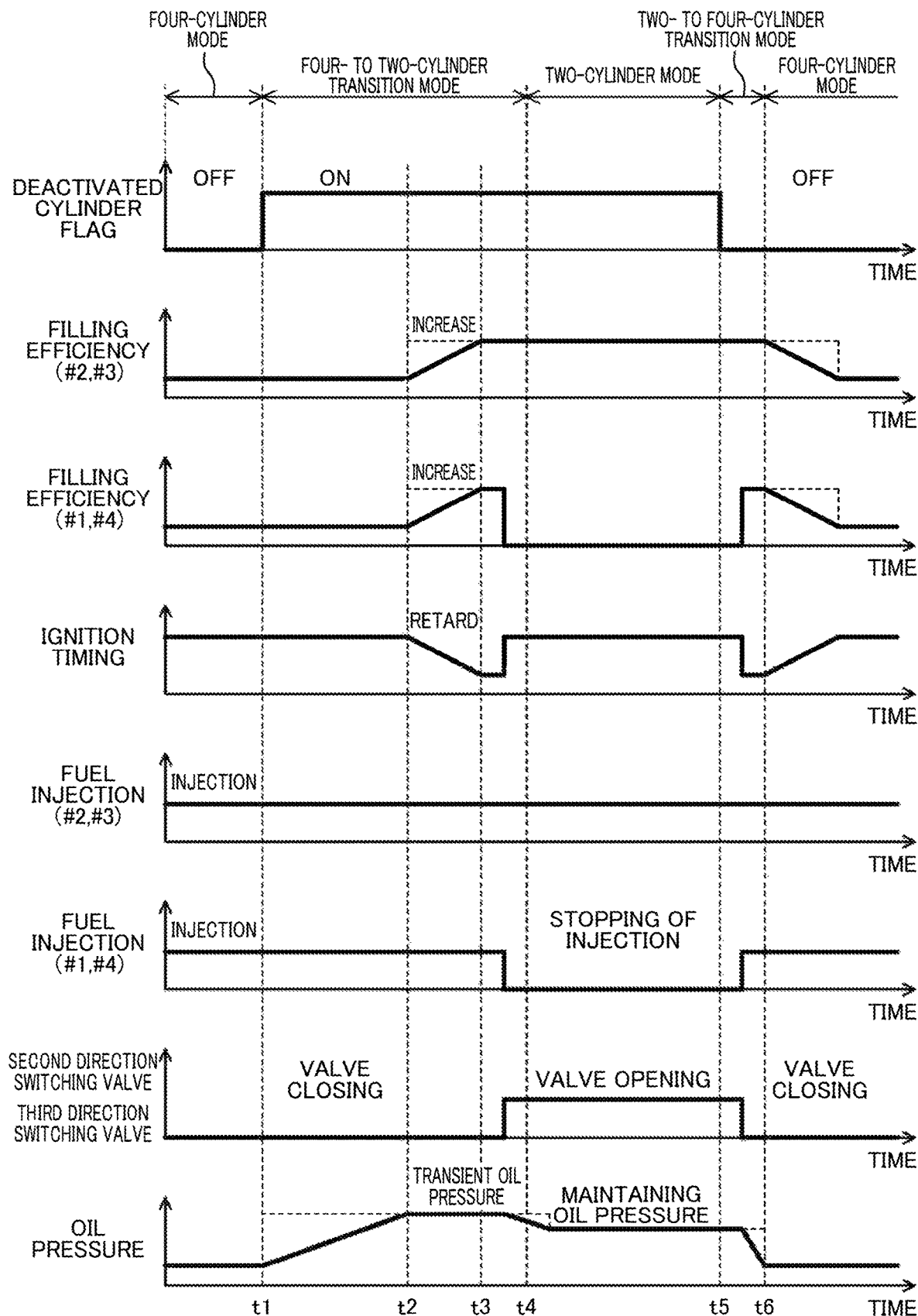
FIG. 10 is a time chart at the time of a transition from the all-cylinder operation to the deactivated cylinder operation.

FIG. 9 exemplifies a flowchart representing processing on switching between the all-cylinder operation and the deactivated cylinder operation, and FIG. 10 exemplifies a time chart at a transition from the all-cylinder operation to the deactivated cylinder operation. The following describes a specific procedure of control on cylinder deactivation with reference to FIG. 8 to FIG. 10. Although not illustrated, in the time chart illustrated in FIG. 10, the requested torque of the engine E is constant.

The controller 60 starts the control illustrated in FIG. 9 along with start-up of the engine E. When the engine E starts up, the controller 60 starts the all-cylinder operation on the four-cylinder mode (Step S1).

In the middle of the all-cylinder operation, the controller 60 monitors the operating state of the engine E. Specifically, the controller 60 grasps the current operating state based on the detection results of the respective sensors and compares the operating state with the map, for example, illustrated in FIG. 7 to determine whether the deactivated cylinder flag described above is established (flag on) or not (flag off) (Step S2). If the deactivated cylinder flag is not established (No at Step S2), the controller 60 returns to Step S1. That is to say, unless the deactivated cylinder flag is established, the controller 60 continues the four-cylinder mode.

In contrast, if the deactivated cylinder flag is established at Step S2, as indicated by a time t1 in FIG. 10, the controller 60 switches from the four-cylinder mode to the four- to two-cylinder transition mode in order to make a transition from the all-cylinder operation to the deactivated cylinder operation. Specifically, upon switching to the four- to two-cylinder transition mode, the controller 60 starts the oil pressure reserve phase (Step S3).

At Step S3, the controller 60 sets the target oil pressure to the transient oil pressure and outputs a control signal to the control valve 84. With this operation, the feedback control of oil pressure is started, and the oil flowing through the hydraulic passage is pressurized. In the middle of the oil pressure reserve phase, as indicated by fuel injection (#1 and #4) in FIG. 10, the all-cylinder operation is continued.

In the middle of the oil pressure reserve phase, the controller 60 determines whether the deactivated cylinder flag is still established, based on the operating state of the engine E (Step S4). If the deactivated cylinder flag is not established (No at Step S4), for example, if the operating state of the engine E falls outside the deactivated cylinder operating range A1 of FIG. 7 after the transition to the oil pressure reserve phase, the controller 60 returns to Step S1. In this case, a transition to the deactivated cylinder operation is canceled so that the engine returns to the steady operation on the four-cylinder mode. In contrast, if the deactivated cylinder flag is established (Yes at Step S4), the controller 60 advances to Step S5 to compare the actual oil pressure with the determination value. The determination value is set in advance and is stored in the controller 60. As described above, in this engine E, the determination value is equal to the transient oil pressure.

Specifically, at Step S5, the controller 60 determines whether the actual oil pressure (refer to the solid line in the lowermost row of FIG. 10) is higher than or equal to the determination value (refer to the broken line in the lowermost row of FIG. 10) If this determination is No (No at Step S5), the controller 60 returns to Step S3 and continues the raising of the oil pressure while monitoring the operating state of the engine E. In contrast, if the actual oil pressure is higher than or equal to the determination value, that is, if the raising of the oil pressure is completed as indicated by a time t2 in FIG. 10, the controller 60 makes a transition from the oil pressure reserve phase to the air reserve phase (Step S6).

To reduce torque shock in the transition from the all-cylinder operation to the deactivated cylinder operation, the output torque is required to be maintained constant between the all-cylinder operation and the deactivated cylinder operation. For this purpose, the controller 60, when making a transition from the four-cylinder mode to the two-cylinder mode, increases the amount of a gaseous mixture to be generated in each of the cylinders. To increase the amount of the gaseous mixture, the intake filling amount and the fuel amount are required to be increased in accordance with the requested torque of the engine E and the air-fuel ratio. The intake filling amount is increased via the filling efficiency.

Given these circumstances, at Step S6, the controller 60 sets the requested filling efficiency (refer to the broken lines in the second and third rows from the top in FIG. 10) at double that during the stationary time with the all-cylinder operation and determines a target value of the opening/closing timing of the intake valve 13 and the exhaust valve 14 corresponding to the setting. The controller 60 then outputs control signals to the intake side VVT 17 and the exhaust side VVT 18 so as to achieve the target value. With this operation, as indicated by the solid lines of the chart in the second to third rows from the top in FIG. 10, increase in the filling efficiency is started. Deviation of actual filling efficiency achieved through control of the intake side VVT 17 and the exhaust side VVT 18 (actual filling efficiency) from the requested filling efficiency is eliminated via the throttle valve 204.

That is to say, the throttle valve 204 configured as an electric throttle has better responsibility than the intake side VVT 17 and the exhaust side VVT 18. Given these circumstances, a target value as a base is first given to the intake side VVT 17 and the exhaust side VVT 18, and deviation of the actual filling efficiency from the requested efficiency achieved when the target value is input and the requested filling efficiency is eliminated through adjustment of the opening of the throttle valve 204 based on the detection result of the airflow sensor 62. With this operation, the requested filling efficiency can be achieved with high precision. In the middle of the air reserve phase, the all-cylinder operation is continued like the oil pressure reserve phase.

The controller 60 also increases the fuel amount to be supplied to each of the cylinders along with the increase in the intake filling amount. A target value of the fuel amount is determined based on the requested torque of the engine E, and a target value for one cylinder is set at double that in the steady state with the all-cylinder operation.

However, as described above, in the middle of the air reserve phase, the all-cylinder operation is continued, and when the intake filling amount and the fuel amount are increased, the amount of the gaseous mixture generated within the cylinders increases, and the overall output torque temporarily increases in the engine E accordingly, which may cause torque shock.

Given these circumstances, in this engine E, the controller 60, in the air reserve phase, retards the ignition timing compared with that in the steady state with the all-cylinder operation (specifically, the start time of raising the oil pressure using the oil control valve 84) so as to decrease the output torque per cylinder. Specifically, the controller 60 determines ignition timing (e.g., timing of MBT or later) by which the overall output torques is maintained substantially constant in the engine E even when the all-cylinder operation is continued while increasing the intake filling amount and outputs control signals corresponding to the ignition timing to the spark plugs 5. With this operation, both the increase in the intake filling amount and reduction in torque shock can be achieved.

In the middle of the air reserve phase, the controller 60 determines whether the deactivated cylinder flag is still established, based on the operating state of the engine E (Step S7). If the deactivated cylinder flag is not established (No at Step S7), for example, if the operating state of the engine E falls outside the deactivated cylinder operating range A1 of FIG. 7 after the transition to the air reserve phase, the controller 60 returns to Step S1. In this case, a transition to the deactivated cylinder operation is canceled to return to the regular operation on the four-cylinder mode. In contrast, if the deactivated cylinder flag is established (Yes at Step S7), the controller 60 advances to Step S8 to compare the actual filling efficiency estimated with the operating state of the engine E (the actual filling efficiency) and the requested filling efficiency.

Specifically, at Step S8, the controller 60 determines whether the actual filling efficiency is higher or equal to the requested filling efficiency. The actual filling efficiency is determined based on, for example, the detection result of the airflow sensor 62 and a map defined in advance. If this determination is No (No at Step S8), the controller 60 returns to Step S6 and continues the increase in the intake filling amount while monitoring the operating state of the engine E. In contrast, as indicated by a time t3 in FIG. 10, if the actual filling efficiency is higher or equal to the requested filling efficiency, that is, if the increase in the intake filling amount is completed, the controller 60 makes a transition from the air reserve phase in the four- to two-cylinder transition mode to the switching phase in the same mode (Step S9).

At Step S9, the controller 60 opens the second direction switching valve 97 and the third direction switching valve 98 and thereby supplies the oil pressurized up to the transient oil pressure to the valve stopping mechanisms 45*d* and 46*d*. With this operation, the valve stopping mechanisms 45*d* and 46*d* are actuated by receiving oil pressure, thereby become the unlock state from the lock state, and stop operation of the first cylinder and the fourth cylinder.

The controller 60 stops actuation of the injectors 4 and the spark plugs 5 in the first cylinder and the fourth cylinder concurrently with the opening of the second direction switching valve 97 and the third direction switching valve 98. In the second cylinder and the third cylinder, in contrast, the controller 60 continues actuation of the injectors 4 and the spark plugs 5. In the second cylinder and the third cylinder, the spark plugs 5 release the retard of the ignition timing (specifically, makes it the same ignition timing as that during the steady state with the all-cylinder operation).

The controller 60 thus causes the engine E to make a transition from the all-cylinder operation to the deactivated cylinder operation. As indicated by a time t4 in FIG. 10, upon completion of the transition to the deactivated cylinder operation, the controller 60 switches from the four- to two-cylinder transition mode to the two-cylinder mode and starts the deactivated cylinder operation on the two-cylinder mode (Step S10).

In the middle of the deactivated cylinder operation, the controller 60 monitors the operating state of the engine E. Specifically, the controller 60 grasps the current operating state based on the detection results of the respective sensors and compares the operating state with the map illustrated in FIG. 7 or the like to determine whether the deactivated cylinder flag described above is still established (Step S11). If the deactivated cylinder flag is established (Yes at Step S11), the controller 60 returns to Step S10. That is to say, as long as the deactivated cylinder flag is established, the controller 60 continues the two-cylinder mode.

In the middle of the deactivated cylinder operation, the requested oil pressure (also referred to as the maintaining oil pressure) of the valve stopping mechanisms 45*d* and 46*d* are set to values larger than that in the steady state with the all-cylinder operation and smaller than the transient oil pressure. As illustrated in FIG. 10, the oil pressure of the oil flowing through the hydraulic passage is adjusted to the maintaining oil pressure thereof.

In contrast, as indicated by a time t5 in FIG. 10, if the deactivated cylinder flag is not established at Step S11, the controller 60 switches from the two-cylinder mode to the two- to four-cylinder transition mode in order to return from the deactivated cylinder operation to the all-cylinder operation (Step S12).

In the two- to four-cylinder transition mode, the controller 60 resumes actuation of the injectors 4 and the spark plugs 5 or actuates the VVTs 17 and 18 in the first cylinder and the fourth cylinder and thereby prepares for returning to the all-cylinder operation and returns the valve stopping mechanisms 45d and 46d to the lock state from the unlock state and thereby resumes operation of the first cylinder and the fourth cylinder as indicated by a time t6 in FIG. 10.

The controller 60 thus returns the engine E from the deactivated cylinder operation to the all-cylinder operation. Upon completion of a return to the all-cylinder operation, the controller 60 returns from the two- to four-cylinder transition mode to the four-cylinder mode (Step S1) to resume the all-cylinder operation on the four-cylinder mode.

<Summary>

As described above, this control device starts the increase in the intake filling amount after the oil pressure increases up to the predetermined determination value. In accordance with the setting of the determination value, the time when the increase in the intake filling amount is started can be delayed. With this operation, as can be seen from FIG. 10, the time when the transient oil pressure is ensured can be advanced relative to the time when the increase in the intake filling amount is completed. Consequently, even when the raising of the oil pressure varies, the deactivated cylinder operation can be started as soon as possible upon completion of the increase in the intake filling amount. Consequently, deterioration in fuel economy performance can be substantially prevented at the time of a transition from the all-cylinder operation to the deactivated cylinder operation.

In particular, this control device sets the determination value defining the time when the increase in the intake filling amount is started is set to the same value as the transient oil pressure. With this setting, as illustrated in FIG. 8 to FIG. 10, in the four- to two-cylinder transition mode, the oil pressure reserve phase for ensuring the transient oil pressure and the air reserve phase for increasing the intake filling amount can be performed one after the other. The transient oil pressure can be surely ensured before the increase in the intake filling amount is completed, and the deactivated cylinder operation can be started without continuing the all-cylinder operation upon completion of the increase in the intake filling amount. Consequently, this stabilizes the transition from the all-cylinder operation to the deactivated cylinder operation and is thus advantageous in substantially preventing deterioration in fuel economy performance.

Other Embodiments

Although the above embodiment exemplifies a configuration in which the determination value defining the time when the increase in the intake filling amount is started is set to be equal to the transient oil pressure, this is not limiting. The determination value may be lower than or equal to a value of the transient oil pressure. For the determination value, a value obtained by multiplying the transient oil pressure by a predetermined rate (e.g., about 0.8 to 0.9) may be used, for example.

DESCRIPTION OF REFERENCE CHARACTERS

100 Engine Body
200 Intake Passage
204 Throttle Valve (Filling Amount Adjusting Device)
4 Injector
5 Spark Plug
13 Intake Valve
14 Exhaust Valve
17 Intake-Side VVT (Filling Amount Adjusting Device)
18 Exhaust-Side VVT (Filling Amount Adjusting Device)
45d Valve Stopping Mechanism
46d Valve Stopping Mechanism
50a Oil Pressure Sensor
60 Controller
81 Oil Pump (Oil Supply Device)
84 Oil Control Valve (Oil Supply Device)
97 Second Direction Switching Valve (Control Valve)
98 Third Direction Switching Valve (Control Valve)
E Engine

The invention claimed is:

1. A device for controlling an engine including a plurality of cylinders and switching between all-cylinder operation, in which all the cylinders are operated, and deactivated cylinder operation, in which some of the cylinders are deactivated, the device comprising:
    a valve stopping mechanism configured to actuate to switch the engine from the all-cylinder operation to the deactivated cylinder operation when oil pressurized up to a predetermined actuating oil pressure is supplied;
    an oil supply device configured to discharge oil to a hydraulic passage connected to the valve stopping mechanism and to adjust an oil pressure of the oil;
    a control valve configured to supply oil from the hydraulic passage to the valve stopping mechanism;
    a filling amount adjusting device configured to adjust an intake filling amount indicating an amount of gas to be supplied to each of the cylinders;
    a controller connected to the oil supply device, the control valve, and the filling amount adjusting device and configured to output a first control signal to the oil supply device, output a third control signal to the control valve, and output a second control signal to the filling amount adjusting device to operate the engine; and
    an oil pressure sensor connected to the controller, and configured to detect an oil pressure of oil flowing through the hydraulic passage and to output a signal indicating a detection result to the controller, wherein
    when a condition of switching the engine from the all-cylinder operation to the deactivated cylinder operation is established, the controller is configured to:
        firstly, output the first control signal to the oil supply device to increase the oil pressure detected by the oil pressure sensor up to the actuating oil pressure while maintaining the intake filling amount in the all-cylinder operation,
        secondly, output the second control signal to the filling amount adjusting device to increase the intake filling amount compared with that at a start time of raising the oil pressure while maintaining the oil pressure at the actuating oil pressure after the oil pressure detected by the oil pressure sensor increases up to a predetermined determination value set at the actuating oil pressure or lower, and
        thirdly, actuate the valve stopping mechanism by outputting the third control signal to the control valve to supply the oil adjusted to the actuating oil pressure to the valve stopping mechanism after completion of the increase in the intake filling amount.

2. The device of claim 1, wherein
the controller, when actuating the valve stopping mechanism, outputs the third control signal to the filling amount adjusting device when the oil pressure detected by the oil pressure sensor increases up to the actuating oil pressure.

3. The device of claim 1, wherein
the oil supply device includes:
a variable capacity oil pump; and
an oil control valve connected to the controller and configured to receive a fourth control signal of the controller and to adjust an oil discharge amount of the oil pump to control the oil pressure of the oil.

4. The device of claim 1, further comprising:
a spark plug connected to the controller and configured to receive a fifth control signal of the controller to ignite a gaseous mixture within the cylinders with a predetermined ignition timing, wherein
the controller outputs the fifth control signal to the spark plug to reduce output torque per cylinder by retarding the ignition timing compared with that at the start time of raising the oil pressure by the oil supply device while maintaining the oil pressure at the actuating oil pressure after the oil pressure detected by the oil pressure sensor increases up to the predetermined determination value set at the actuating oil pressure or lower, and
the controller outputs the fifth control signal to the spark plug to end the retarding of the ignition timing after completion of the increase in the intake filling amount.

5. The device of claim 1, wherein
the filling amount adjusting device includes:
a variable valve timing mechanism provided in each of the cylinders and configured to change opening/closing timing of an intake valve and an exhaust valve of an associated one of the cylinders; and
a throttle valve provided in an intake passage connected to the cylinders and configured to adjust a flow of gas passing through the intake passage.

6. A method of controlling, via a device, an engine including a plurality of cylinders and switching between all-cylinder operation, in which all the cylinders are operated, and deactivated cylinder operation, in which some of the cylinders are deactivated,
the device including:
a valve stopping mechanism configured to actuate to switch the engine from the all-cylinder operation to the deactivated cylinder operation when oil pressurized up to a predetermined actuating oil pressure is supplied;
an oil supply device configured to discharge oil to a hydraulic passage connected to the valve stopping mechanism and to adjust an oil pressure of the oil;
a control valve configured to supply oil from the hydraulic passage to the valve stopping mechanism;
a filling amount adjusting device configured to adjust an intake filling amount indicating an amount of gas to be supplied to each of the cylinders;
a controller connected to the oil supply device, the control valve, and the filling amount adjusting device and configured to output a first control signal to the oil supply device, output a third control signal to the control valve, and output a second control signal to the filling amount adjusting device to operate the engine; and
an oil pressure sensor connected to the controller, and configured to detect an oil pressure of oil flowing through the hydraulic passage and to output a signal indicating a detection result to the controller, the method comprising:
firstly, outputting the first control signal to the oil supply device to increase the oil pressure detected by the oil pressure sensor up to the actuating oil pressure while maintaining the intake filling amount in the all-cylinder operation;
secondly, outputting the second control signal to the filling amount adjusting device to increase the intake filling amount compared with that at a start time of raising the oil pressure while maintaining the oil pressure at the actuating oil pressure after the oil pressure detected by the oil pressure sensor increases up to a predetermined determination value set at the actuating oil pressure or lower; and
thirdly, actuating the valve stopping mechanism by outputting the third control signal to the control valve to supply the oil adjusted to have the actuating oil pressure to the valve stopping mechanism after completion of the increase in the intake filling amount.

7. The device of claim 1, wherein
after the condition of switching the engine from the all-cylinder operation to the deactivated cylinder operation is established, the controller determines whether the condition is established during the increase in the intake filling amount, and
when the condition is not established, the controller cancels the maintenance of the oil pressure and the increase in the intake filling amount, and causes the engine to perform the all-cylinder operation.

8. The method of claim 6, further comprising:
after a condition of switching the engine from the all-cylinder operation to the deactivated cylinder operation is established, determining whether the condition is established during the increase in the intake filling amount, and
when the condition is not established, canceling the maintenance of the oil pressure and the increase in the intake filling amount, and causing the engine to perform the all-cylinder operation.

9. The method of claim 6, further comprising:
when actuating the valve stopping mechanism, outputting the third control signal to the filling amount adjusting device when the oil pressure detected by the oil pressure sensor increases up to the actuating oil pressure.

10. The method of claim 6, further comprising:
outputting a fourth control signal to an oil control valve to adjust an oil discharge amount of a variable capacity oil pump of the device to control the oil pressure of the oil.

11. The method of claim 6, further comprising:
outputting a fifth control signal to a spark plug to ignite a gaseous mixture within the cylinders with a predetermined ignition timing to reduce output torque per cylinder by retarding the ignition timing compared with that at the start time of raising the oil pressure by the oil supply device while maintaining the oil pressure at the actuating oil pressure after the oil pressure detected by the oil pressure sensor increases up to the predetermined determination value set at the actuating oil pressure or lower; and
outputting the fifth control signal to the spark plug to end the retarding of the ignition timing after completion of the increase in the intake filling amount.

* * * * *